(12) United States Patent
Brown

(10) Patent No.: US 7,931,412 B2
(45) Date of Patent: Apr. 26, 2011

(54) EXTENDABLE CAMERA SUPPORT AND STABILIZATION APPARATUS

(76) Inventor: Garrett W. Brown, Philadelphia, PA (US)

( * ) Notice: Subject to any disclaimer, the term of this patent is extended or adjusted under 35 U.S.C. 154(b) by 0 days.

(21) Appl. No.: 12/618,057

(22) Filed: Nov. 13, 2009

(65) Prior Publication Data

US 2010/0124414 A1 May 20, 2010

Related U.S. Application Data

(60) Provisional application No. 61/114,709, filed on Nov. 14, 2008, provisional application No. 61/119,921, filed on Dec. 4, 2008.

(51) Int. Cl.
*G03B 17/00* (2006.01)
(52) U.S. Cl. ...................................................... 396/421
(58) Field of Classification Search ................... 396/421
See application file for complete search history.

(56) References Cited

U.S. PATENT DOCUMENTS

| | | |
|---|---|---|
| 494,627 A | 4/1893 | Conradt |
| 765,980 A | 7/1904 | Mercier |
| 2,156,862 A | 5/1939 | Maugard |
| 2,945,428 A | 7/1960 | Dearborn |
| 3,756,549 A | 9/1973 | Lange |
| 3,914,540 A | 10/1975 | Slater |
| 3,919,902 A | 11/1975 | Johnson |
| 4,017,168 A | 4/1977 | Brown |
| 4,092,673 A | 5/1978 | Adams |
| 4,155,100 A | 5/1979 | Hill, Jr. |
| 4,156,512 A | 5/1979 | Brown |
| 4,158,490 A | 6/1979 | Gottschalk |
| 4,206,983 A | 6/1980 | Nettman et al. |
| 4,208,028 A | 6/1980 | Brown et al. |
| 4,233,634 A | 11/1980 | Adams |
| 4,270,387 A | 6/1981 | Hoffman |
| 4,306,714 A | 12/1981 | Loomis |
| 4,394,075 A | 7/1983 | Brown et al. |
| 4,474,439 A | 10/1984 | Brown |

(Continued)

FOREIGN PATENT DOCUMENTS

FR 2722893 A1 1/1996

(Continued)

OTHER PUBLICATIONS

International Search Report and Written Opinion dated Jul. 15, 2010 for PCT Patent Application No. PCT/US2010/034764.

(Continued)

*Primary Examiner* — Rodney E Fuller
(74) *Attorney, Agent, or Firm* — Schnader Harrison Segal & Lewis LLP

(57) ABSTRACT

A support system used to orient and utilize equipment remotely positioned from an operator and supported in a stabilized manner. The support system includes a balance pole with a master end and a slave end. Master component masses are connected to and balanced at the balance pole master end on a master sled with a master gimbal apparatus, and slave component masses are connected to and balanced at the balance pole slave end on a support structure or slave sled with a slave gimbal apparatus. A tertiary gimbal is attached to the balance pole at its center of balance. The system includes a mechanism to replicate the motion of the master gimbal at the slave gimbal so the orientation of the master sled is mimicked by the slave sled.

30 Claims, 19 Drawing Sheets

U.S. PATENT DOCUMENTS

| | | | |
|---|---|---|---|
| RE32,213 | E | 7/1986 | Brown |
| 4,625,938 | A | 12/1986 | Brown |
| 4,657,267 | A | 4/1987 | Jaumann et al. |
| 4,672,436 | A | 6/1987 | Hawthorne |
| 4,710,819 | A | 12/1987 | Brown |
| 4,756,655 | A * | 7/1988 | Jameson ............................ 414/2 |
| 4,849,778 | A | 7/1989 | Samuelson |
| 4,946,272 | A | 8/1990 | Brown |
| 4,976,387 | A | 12/1990 | Spianti |
| 4,989,466 | A | 2/1991 | Goodman |
| 5,065,249 | A | 11/1991 | Horn et al. |
| 5,098,182 | A | 3/1992 | Brown |
| 5,229,798 | A | 7/1993 | Brown |
| 5,243,370 | A | 9/1993 | Slater |
| 5,360,196 | A | 11/1994 | DiGiulio et al. |
| 5,389,987 | A | 2/1995 | Corbeil |
| D358,832 | S | 5/1995 | Lenny et al. |
| 5,435,515 | A | 7/1995 | Digiulio |
| 5,490,655 | A | 2/1996 | Bates |
| 5,579,071 | A | 11/1996 | Wetzel |
| 5,752,112 | A | 5/1998 | Paddock |
| 5,786,854 | A | 7/1998 | Slade et al. |
| 5,850,579 | A | 12/1998 | Melby et al. |
| 5,856,862 | A | 1/1999 | Kokush |
| 5,908,181 | A | 6/1999 | Valles-Navarro |
| 5,940,644 | A | 8/1999 | Putora |
| 5,963,749 | A | 10/1999 | Nicholson |
| 6,293,676 | B1 | 9/2001 | Holway |
| 6,377,011 | B1 | 4/2002 | Ben-Ur |
| 6,530,702 | B2 | 3/2003 | Harris |
| 6,578,967 | B1 | 6/2003 | Paddock |
| 6,685,148 | B2 | 2/2004 | Zadok |
| 6,701,081 | B1 | 3/2004 | Dwyer et al. |
| 6,752,541 | B1 | 6/2004 | Dykyj |
| 6,776,488 | B2 | 8/2004 | Burbulla |
| 6,858,003 | B2 | 2/2005 | Evans |
| 6,923,542 | B2 * | 8/2005 | Harris ............................ 352/243 |
| 6,999,852 | B2 | 2/2006 | Green |
| 7,000,883 | B2 | 2/2006 | Mercadal |
| 7,055,368 | B2 | 6/2006 | Schneider |
| 7,065,888 | B2 | 6/2006 | Jaklitsch et al. |
| 7,128,419 | B2 | 10/2006 | Harris |
| 7,192,203 | B2 | 3/2007 | Schaller |
| 7,371,028 | B2 | 5/2008 | Gordon |
| 7,390,131 | B2 | 6/2008 | Schaller |
| 7,480,041 | B2 | 1/2009 | Lindner |
| 7,618,016 | B2 | 11/2009 | Brown |
| 7,625,090 | B2 | 12/2009 | Brown et al. |
| 2005/0043718 | A1 | 2/2005 | Madhani et al. |
| 2006/0262274 | A1 | 11/2006 | Brown et al. |
| 2007/0050139 | A1 | 3/2007 | Sidman |
| 2007/0080275 | A1 | 4/2007 | Stachowski et al. |
| 2008/0046122 | A1 | 2/2008 | Manzo |
| 2008/0122958 | A1 | 5/2008 | Huseth et al. |
| 2008/0187308 | A1 | 8/2008 | Hannan |
| 2010/0065705 | A1 | 3/2010 | Brown et al. |
| 2010/0095483 | A1 | 4/2010 | Brown |
| 2010/0124414 | A1 | 5/2010 | Brown |

FOREIGN PATENT DOCUMENTS

| | | |
|---|---|---|
| JP | 57023247 A | 2/1982 |
| WO | 9615404 A1 | 5/1996 |
| WO | 2009033308 A1 | 3/2009 |

OTHER PUBLICATIONS

International Search Report and Written Opinion dated Apr. 13, 2010 for PCT Patent Application No. PCT/US2009/064351.

Clanton, S Proceeding Paper, A Novel Machine Interface for Scaled Telesurgery, Medical Imaging 2004: Visualization, Image-Guided Procedures and display 5367, 2004, 697-704 (Abstract).

* cited by examiner

EXTENDABLE CAMERA SUPPORT AND STABILIZATION APPARATUS

This application is based on, and claims priority to, U.S. provisional application Ser. No. 61/114,709, filed Nov. 14, 2008, and application Ser. No. 61/119,921, filed Dec. 4, 2008, both entitled Extendable Camera Stabilization and Support Apparatus.

The invention relates to stabilizers for cameras and other similar devices. Particular, embodiments of the invention relate to extendable camera stabilization devices that are typically body-mounted, and are designed to produce smooth moving shots over all types of terrain.

BACKGROUND OF THE INVENTION

Body mounted camera stabilization devices are typically comprised of a camera equipment support system with a three-axis gimbal at its center of gravity. The support structure is usually attached to an articulated support arm that is in turn attached to an operator-worn vest, although the arm may be mounted to other stationary or mobile structures. These devices are designed to support and isolate a camera or other device from the unwanted movements of a walking, running or otherwise moving operator, vehicle or operator/vehicle combination. Common examples of such devices are those marketed under the trademark Steadicam®.

The body-mounted stabilizer camera support structure, conventionally known as the 'sled', generally includes extended masses to enhance inertial stability and to position the center of balance in an accessible location. The camera support 'sled' structure is approximately neutrally counterbalanced by a rigidly mounted camera at one end of a center-post, and other rigidly mounted components, (video monitor, battery, focus equipment, microwave transmission equipment, camera control unit equipment, other electronics, etc) at the other end of the post. The camera can thus be aimed in any direction by slight hand pressure adjacent to the gimbal. The mutually perpendicular directions of these aiming motions are distinctly referred to as pan, tilt and roll.

As used herein, unless otherwise specified, "roll" denotes rotation about an axis generally parallel to the camera's lens, "pan" describes rotation about an axis that runs down the center of the camera-support central post, and which is offset 90° from the roll axis 'Tilt' describes rotation about a substantially horizontal axis perpendicular to both the lens axis and the pan axis.

Since the camera and monitor are rigidly attached to the support structure, vertical camera travel, while maintaining a level camera horizon, is restricted to the maximum vertical excursion of the articulated support arm, which is typically 32 inches in standard mode plus an overlapping, but discontinuous, 32 inches in 'low mode'. Conversion to low mode requires mechanically removing the camera, inverting the support structure, and reattaching it to the inverted support structure via a so-called 'low-mode bracket' that is different for every camera. Additionally, the monitor must be inverted, the gimbal adjusted along the center-post to restore the desired slight bottom-heaviness of the balanced masses; a special gimbal-to-arm attachment bracket must be employed; and all cables of the entire camera system must be detached and reattached.

Finally, the system must be rebalanced. This time-intensive procedure must be followed every time the conversion from low mode to high, or high mode to low, is required. Often, due to time constraints, the shot is eliminated, much to the chagrin of the director and operator.

Another problem for operators of these devices arises when a low-mode shot requires surmounting some type of obstacle, such as a car hood, fence, bar, desk, etc. due limited lateral reach of the support arm.

Gyro-leveled, 'roll-cage-mounted' camera supports are known, and are marketed, for example, under the trade name "AR", which permit continuous 'low-mode' to 'high-mode' shooting. These devices, however are extremely awkward to operate, since, on the way from low to high positions, 'tilt' and 'pan' progressively require non-intuitive manipulations of the stabilizer's center post which are unrelated to the camera's actual orientation.

Extended pole-supported, remotely controlled camera mounts, including one marketed as 'Pole-Cam', are known in the art and simply constructed, but they are extremely unstable unless mounted on stationary tripod supports.

A need therefore exists for an apparatus for augmenting the capabilities of equipment-stabilizing supports—in particular body-mounted camera stabilizers—and extending their reach and angular agility so that stabilized operations, such as shots, can be made that preferably include unrestricted and intuitive angular control of the camera, as well as large lateral and vertical displacements from the operator's position,

SUMMARY OF THE INVENTION

Embodiments of the invention provide a device to orient and utilize equipment remotely positioned from an operator and supported in a stabilized manner Particular embodiments of the invention are compatible with lightweight cameras, including those less than one pound, or even less than 0.5 pounds.

A support system according to an illustrative embodiment of the invention, comprises a balance pole with a primary (master) end and a secondary (slave) end. One or more primary component masses are connected to and balanced at the balance pole master end on a support structure or master sled with a master gimbal apparatus, and one or more secondary component masses are connected to and balanced at the balance pole slave end on a support structure or slave sled with a slave gimbal apparatus. A tertiary gimbal is attached to the balance pole at its center of balance. The support system includes a mechanism to replicate the motion of the primary gimbal at the secondary gimbal. Accordingly, the orientation of the master gimbal is mimicked by the slave gimbal.

In an illustrative embodiment of the invention, the motion replicating mechanism comprises one or more sensors that detect the rotational motion about one or more axes of rotation of the master gimbal, and one or more motors functionally connected to the slave gimbal to impart rotational motion about one or more axes of rotation of the slave gimbal. The motors impart the rotational motion based upon signals received from the sensors, thereby replicating the motion about the axes of rotation of the primary gimbal about the axes of rotation of the secondary gimbal. Servo motors are particularly applicable to embodiments of the invention.

The primary and secondary gimbal apparatuses can provide three degrees of angular freedom, with a motor and sensor associated with each degree. In alternative embodiments of the invention, the motion replicating mechanism comprises one or more rigid mechanical connections causing the primary component masses to be fixed with respect to the secondary component masses with respect to rotation about one or more axes of rotation, so that motion in a particular degree of freedom at the master end will be replicated at the slave end without use of a sensor/motor system. The mechanically synchronized degrees of freedom can be for example, rotation about the slave and master central posts, and/or rotation made possible by the slave and master gimbals. Examples of rigid connections include tie rods, toothed gears and pulleys/belts.

When the support system has a rigid axial connection, for example in the form of an active balance pole, a handgrip can be employed that is connected to, but freely rotatable about, the balance pole. This can be accomplished by use of at least one annular bearing for example.

In exemplary embodiments of the invention, shroud-and-stay components and/or an adjustable weight collar may be employed in connection with the balance pole to center its balance about its longitudinal axis so the orientation and/or balance of the master and slave (primary and secondary) balanced component masses is not affected by any 'sag' or columnar irregularity of the balance pole.

In an exemplary embodiment of the invention, a monitor is positioned at the master end and a camera at the slave end. In yet another illustrative embodiment of the invention, a camera is positioned at both the slave and master ends.

The support system may be attached to an articulated arm, and further the articulated arm may be attached to an operator's vest.

The invention also includes methods of balancing and utilizing equipment by providing a support system according to any of the embodiments of the invention; balancing the primary component masses with respect to one another at the primary end; balancing the secondary component masses with respect to one another at the secondary end; balancing the primary masses with respect to the secondary masses about the balance pole; balancing the balance pole about its longitudinal axis; and moving the primary gimbal apparatus, thereby replicating the movement in the secondary gimbal apparatus while maintaining the approximate balance of the component masses.

DESCRIPTION OF THE DRAWINGS

The invention is best understood from the detailed description when read in conjunction with the accompanying drawings.

DETAILED DESCRIPTION OF THE INVENTION

Figure 1:
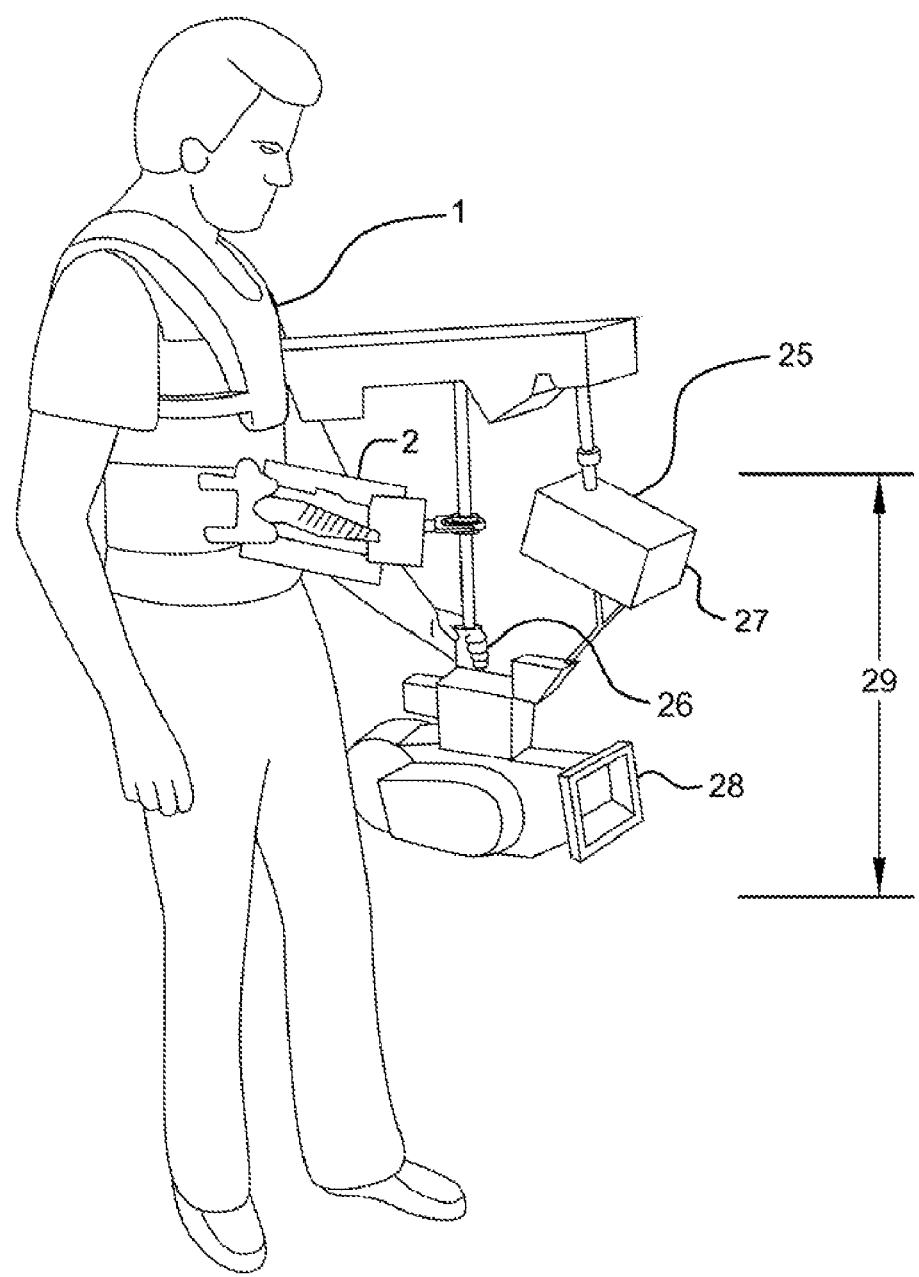
FIG. 1 is a prior art camera support and stabilizing system shown in 'low-mode' with the camera underslung.

In general, illustrative embodiments of the invention employ an inherently stable and controllable sled of the Steadicam-type for example, (gimbaled roughly at its center-of-balance and rendered angularly inert by expanded masses) as a 'servo controller' to cause a secondary, spatially-displaced, 'slave sled' to synchronously pan, tilt and/or roll at the other end of an a balance pole. The balance pole is supported by its own gimbal at its own center of gravity.

Exemplary embodiments of the invention employ a plurality of substantially frictionless rotation-sensors to detect three mutually perpendicular rotations at the master sled gimbal as it is moved and aimed with respect to the momentary orientation of the attached balance pole. These rotations are then reproduced by a plurality of servo motors at the analogous slave sled gimbal mounted at the opposite end of the balance pole. Some of these 'slaved' rotations are caused by deliberate angular re-orientations of the master sled. Others can be manifest as rotations in all three axes at the master sled gimbal, yet are only caused by traversing and/or elevating moves of the balance pole itself; in which case, the angular position of the master sled may not change, but any or all of the sensors can be registering rotations that, when reproduced at the slave gimbal, serve to keep the camera angularly static as well. In an alternative embodiment of the invention, there can be less than a one-to-one ratio of sensors to controlled degrees of angular motion of the camera or equipment or less than a one-to-one ratio of motors to controlled degrees of freedom. For example, a single sensor can sense motion around more than one axis, and/or a single motor can generate movement about more than one axis.

The balance pole can be extendable by, for example a telescopic or modular structure. The master sled and slave sled can be releasable from the balance pole. With the attachment of various weights to the master sled, it can counterbalance the miniature slave sled at 'see-saw' ratios of, for example, 16:1. Assuming a lightweight pole, such as composed of carbon fiber, the weight of the master sled vs. the weight of the miniature sled will roughly equal the inverse ratio of the distances between sleds and the balance pole gimbal. A three-pound slave sled 24 feet from the gimbal can therefore be counterbalanced by a 48 lb master sled 1.5 feet away. Adding a hypothetical 9 lbs for the long pole and its gimbal, the total is 60 lbs, which is well within the top-end loads camera operators routinely support.

Other illustrative embodiments of the invention, may substitute the direct mechanical axial connection of the balance pole for swiveling servo connections of master sled and slave sled to the axis of the balance pole. This mechanical interconnection employs the balance pole itself, in axial rotation, to lock, one-for-one, the axis of rotation of the slave and master gimbal yokes, in what is designated as the 'pitch' axis.

Other mechanically interlocked embodiments of the invention may replace one or more of the remaining electronic servo connections using other known types of mechanical inter-connection, such as toothed belts between pulleys, 'dentist-drill' type pulley and belt combinations, functionally connected to toothed gears, which can synchronize gimbal-yoke angles and pan angles between the master and slave sleds.

Additional, mechanically interlocked embodiments of the invention may employ tie rods or pulley interconnections to interconnect a second horizontal axis of rotation to eliminate counterweights below the slaved camera gimbal and above the master sled gimbal, and cause the remaining master sled counterweights to effectively balance the slave sled camera and permit angular control as if master and slave sleds were interconnected above and below on a single virtual center post. This arrangement may enable the use of heavier cameras without the necessity of separately counter-weighting either the slave or master sleds, and may therefore reduce the total weight of the invention potentially by nearly half Additionally, mechanically locked embodiments of the invention may employ paired tie rods connected between symmetrical crank sets extending laterally from, each of the master center post and the slave center post in order to synchronize pan motions (up to plus/minus 180° of rotation. If displaced appropriately above or below the respective master and slave gimbals, such tie-rod pairs can also serve to synchronize pitch angles between the master and slave posts.

FIG. 1 depicts a prior art stabilizing camera support system, known as a Steadicam®, deployed in 'low-mode' with camera 28 underslung. The maximum vertical range of potential lens heights is indicated by line 29.

Figure 2:
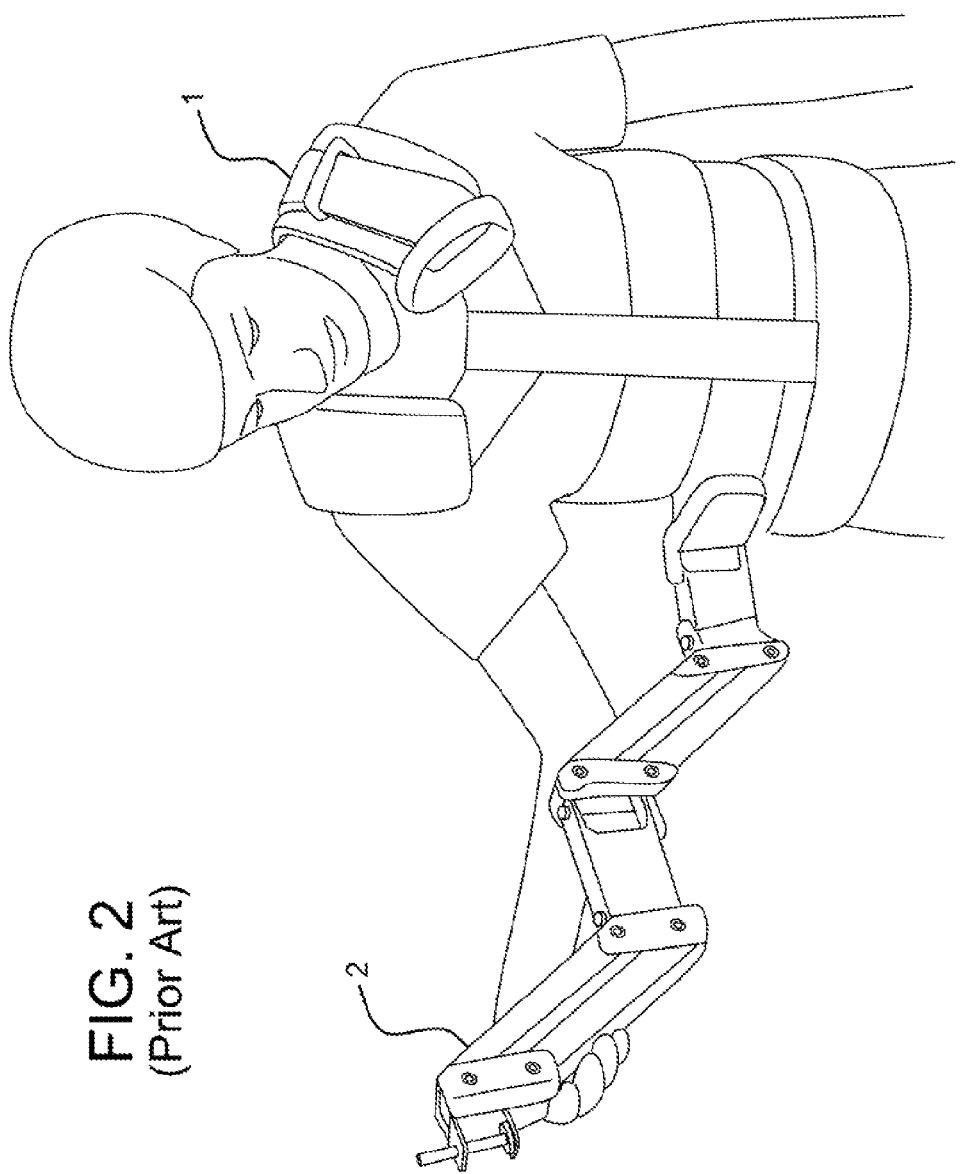
FIG. 2 is a front view of a typical prior art lightweight vest and articulating support arm.

FIG. 2 provides a front view of a typical prior art lightweight 'vest' 1 and articulating support arm 2 which can be used to spatially isolate and support, or a part of embodiments of the invention.

Figure 3:
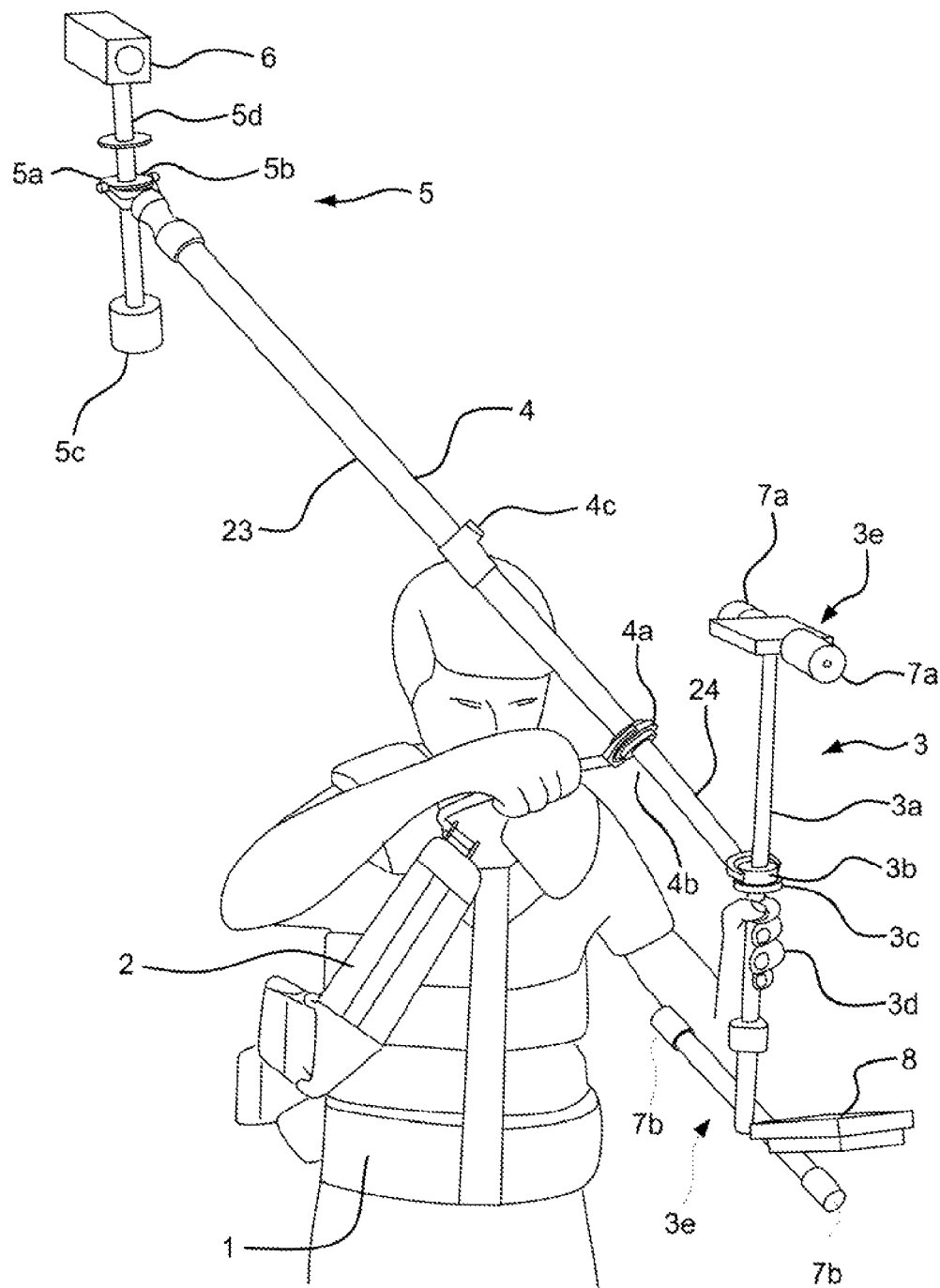
FIG. 3 shows an illustrative embodiment of the invention deployed for maximum lens height.

FIG. 3 shows an illustrative embodiment of the invention deployed to obtain the maximum lens height for camera 6. Arm 2 is attached to vest 1 and is raised to the limit of its travel. Arm 2 is attached to balance pole 4 by means of pole gimbal 4a located between master sled 3 and slave sled 5 at the center-of-balance 4b of the apparatus.

Master sled 3 is attached to balance pole 4 at master sled gimbal 3b. Master sled gimbal 3b provides three degrees of angular isolation between balance pole 4 and center post 3a. In FIG. 3, balance pole 4 is pitched up to maximally elevate camera 6. Slave sled 5 is attached to pole 4 at slave gimbal 5b. Slave sled 5 is oriented by servo motors (shown for example in FIG. 6) to duplicate the positions and angular movement at master gimbal 3b. The servo motors respond to signals based on information from sensors located at master sled 3 (see for example FIG. 5). Signals from sensors at the master sled may be conditioned, such as by servo amplifiers and/or software. The operator views the remote image from camera 6 on monitor 8, which is located at master sled 5.

Servo motors are used as an example in illustrative embodiments of the invention presented herein. Other sensor/motor combinations are within the scope of the invention. Preferably the sensor/motor combination will be a closed loop control system. For many applications low vibration, and low noise are desirable. High speed, for example about 3000 rpm to about 5000 rpm may also be desirable. In an illustrative embodiment of the invention, the resolution is in the range of about 1000 pulses per revolution to about 10,000 pulses per revolution. In an alternative embodiment a stepper motor or the like is used, which may lessen lag time between the motion of the master sled and slave sled, but such motors are not closed loop and tend to have higher noise and vibration.

Figure 4:
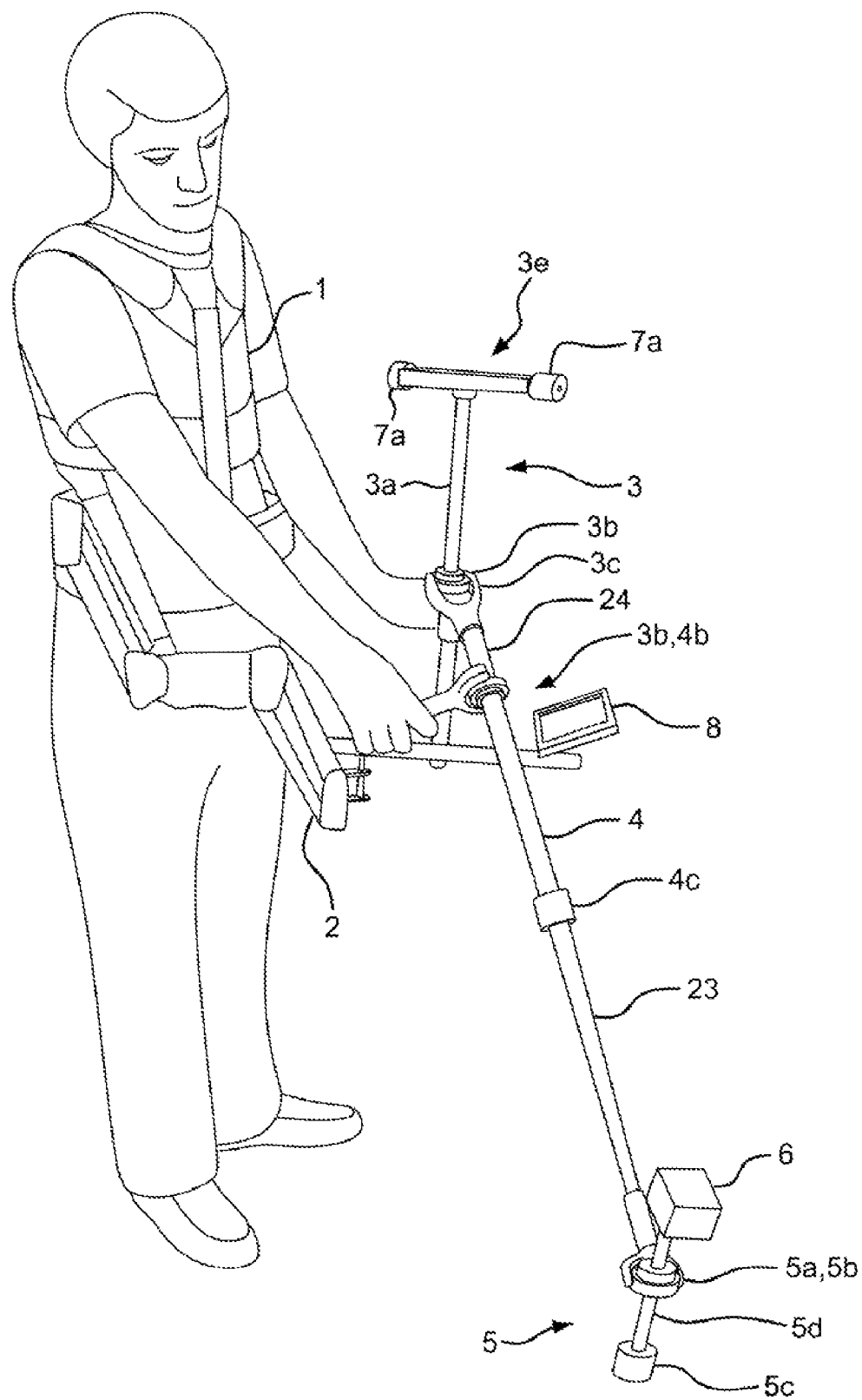
FIG. 4 shows an illustrative embodiment of the invention deployed for minimum lens height.

FIG. 4 shows an illustrative embodiment of the invention deployed for minimum lens height of camera 6. Arm 2 is depressed to the lower limit of its travel and balance pole 4 is angled downward. Camera 6 on slave sled 5 is aimed in a direction based on the orientation of Master sled 3. In a particular embodiment of the invention, camera six remains aimed in the same direction as master sled 3. This is accomplished by sensing, preferably continuously, the momentary angle between master gimbal 3b and balance pole 4, or other spatial relationship that changes as master sled 3 is repositioned, and reproducing that angle (or other measurement) by means of motors, such as servo motors, (not shown) arranged to drive, and thus synchronously reposition elements of slave gimbal 5b.

The interconnection between the master and slave components can be mechanical or electrical. It is noted that the motors and sensor can be hard-wired to one another or can be wirelessly connected. Mechanical connections can include tie rods, pulleys, gears or similar devices. A mechanical linkage connected in a manner based on parallelograms, such as used in a pantograph to translate movement of a primary point to the movement of a secondary point can be adapted for use in embodiments of the invention. This can include amplification or reduction of movement from the primary to secondary point, or one-to-one correspondence.

The figures generally show a camera located at the slave end of the apparatus and a monitor located at the master end. In an alternative embodiment of the invention, a camera is installed at both the slave and master ends of the apparatus for simultaneous filming.

Figure 5:
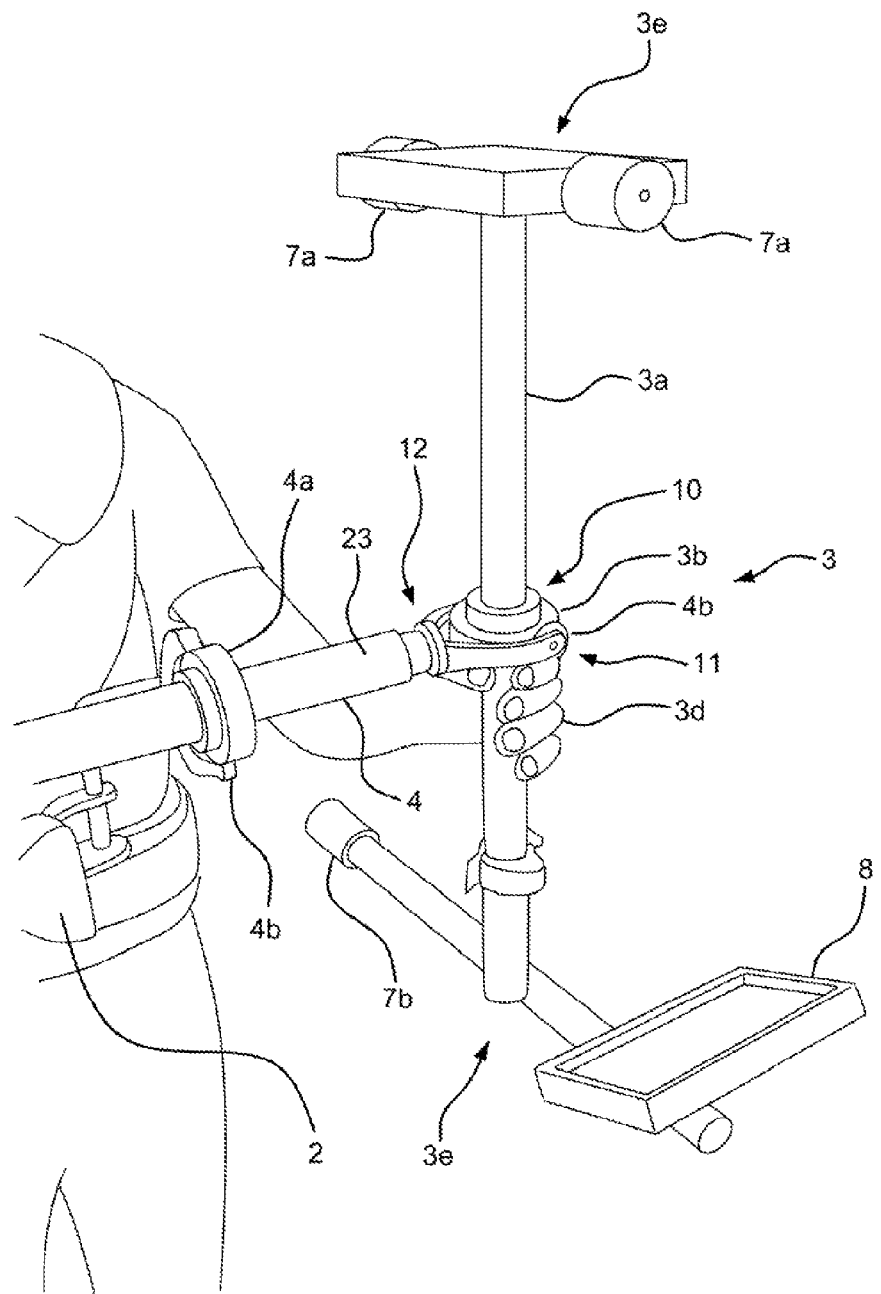
FIG. 5 shows a master sled according to an illustrative embodiment of the invention.

FIG. 5 shows a closer view of master sled 3 according to an illustrative embodiment of the invention. Gimbal 3b is located just above center-of-balance 3c. Counterbalancing equipment 3e, consists of upper equipment 7a and lower equipment 7b, including monitor 8. Various other components can be including in the counterbalancing equipment such as a camera CCU (camera control unit) and associated batteries, microwave transmitters, lens-control amplifiers, etc. Non-functional masses can also be used as weights. The operator's hand controls the attitude of master sled 3 at position 3d (preferably as near as possible to center of balance 3c). Sensors 10, 11 and 12 detect the angular position (in three mutually perpendicular axes) of center post 3a relative to balance post 4. Balance post 4 is supported by gimbal 4a at its own center of balance 4b. Master sled 3 can be for example, in all respects a Steadicam® sled except that it does not necessarily include a camera (which is instead mounted remotely, such as shown in FIGS. 4/5). Master sled 3 is rendered angularly inert by positioning masses at selectable distances from the center post, and is isolated by gimbal 3b and arm 2 from the unwanted motions of the operator. Preferably it is balanced to be slightly bottom heavy, adjusted to hang approximately level, such as by vernier balance adjustments for example, and can be oriented in any angular direction by, for example the operators hand at location 3d. The apparatus can be configured to allow the lightest touch of the operator's hand to orient master sled 3. Master sled 3 is rendered inert in all three axes of pan, tilt, and roll by selectively positioning the upper and lower sets of counterweight equipment 7a and 7b and monitor 8 at various distances from the center post. Sensors 10, 11 and 12 preferably operate substantially frictionlessly, and therefore do not degrade angular stability. Master sled 3 may thus provide a stable, angularly agile reference platform that can be aimed at will by the operator, and thereby control the remotely positioned slave sled 5 and its attached camera 6. Master sled 3 maintains its angular orientation even when balance pole 4 is being elevated or traversed, and therefore so also does the slave sled 5 and camera 6, which thus correspondingly both 'backpans' and 'backtilts' to negate or reduce angular effects produced by traversing and/or elevating balance pole 4.

Figure 6:
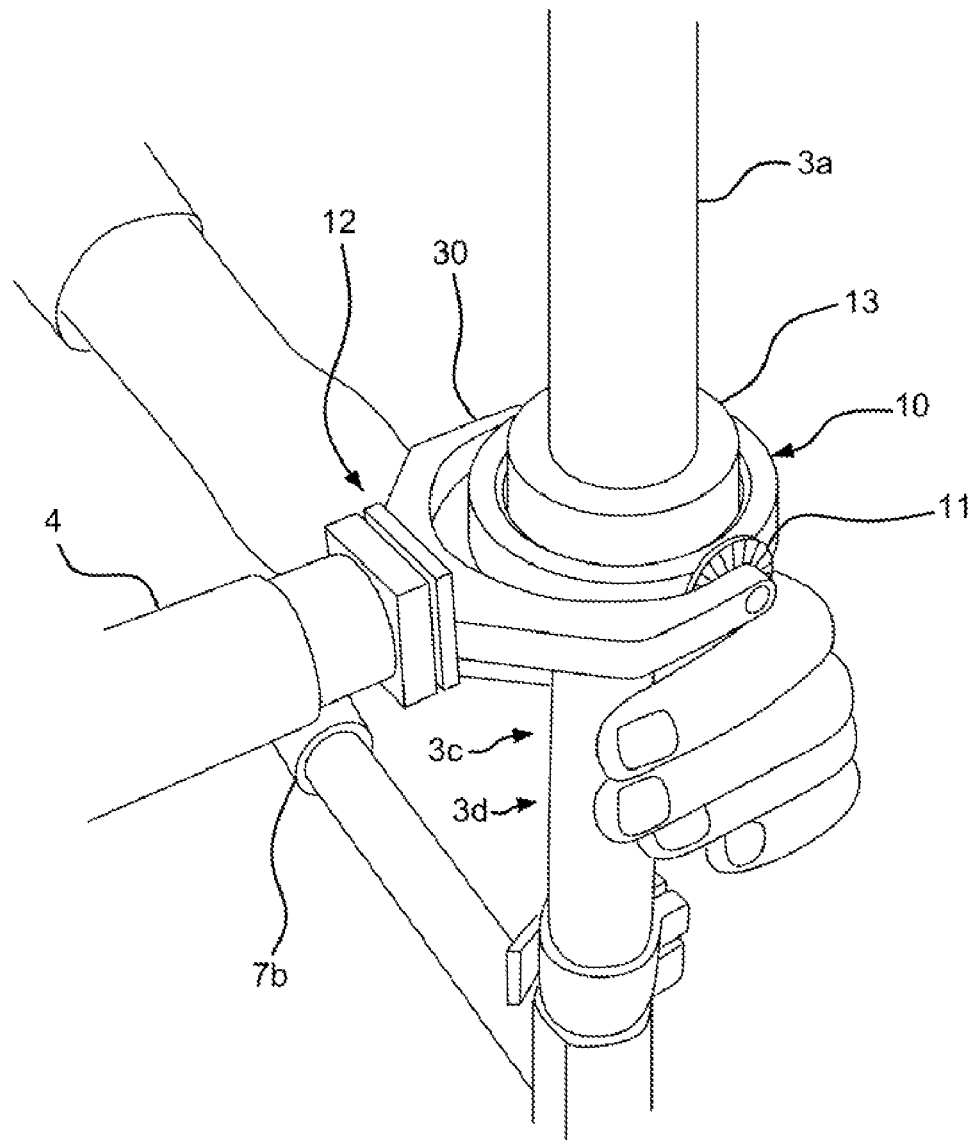
FIG. 6 is an enlarged view of the gimbal portion of the master sled detailing three rotation sensors according to an illustrative embodiment of the invention.

FIG. 6 is an enlarged view of the gimbal portion 3b of the master sled 3 showing sensors 10, 11, 12 according to an illustrative embodiment of the invention. In this embodiment, sensors 10, 11 and 12 are positioned mutually perpendicular to one another, and each senses rotation in one of the three mutually perpendicular directions. The directions may be for example pan about the longitudinal center post axis, pitch about a master sled gimbal axis perpendicular to the pan axis, and roll about the balance pole longitudinal axis, which is mutually perpendicular to the pan and pitch axes. Other sensor positioning and degrees of freedom included are within the scope of the invention. The momentary angle between center post 3a and post 4 resolves into three mutually perpendicular component angles that are detected by the three sensors 10, 11 and 12. Sensor 10 records the angle between center post 3a and the plane of a pan bearing race of gimbal 3. Sensor 11 records the angle between the plane of yoke 30 and center post 3a. Sensor 12 records the angle between the plane of yoke 30 and post 4. These detected angles are then transmitted to the analogous servo motors on slave sled gimbal 5b and reproduced so that the camera on slave sled 5 is synchronously aimed. Slave sled gimbal 5b and counter weight equipment 5c (shown in FIG. 4 for example) serve to keep slave sled 5 and camera 6 stabilized during repositioning resulting from servo motors 10, 11, 12.

Figure 7:
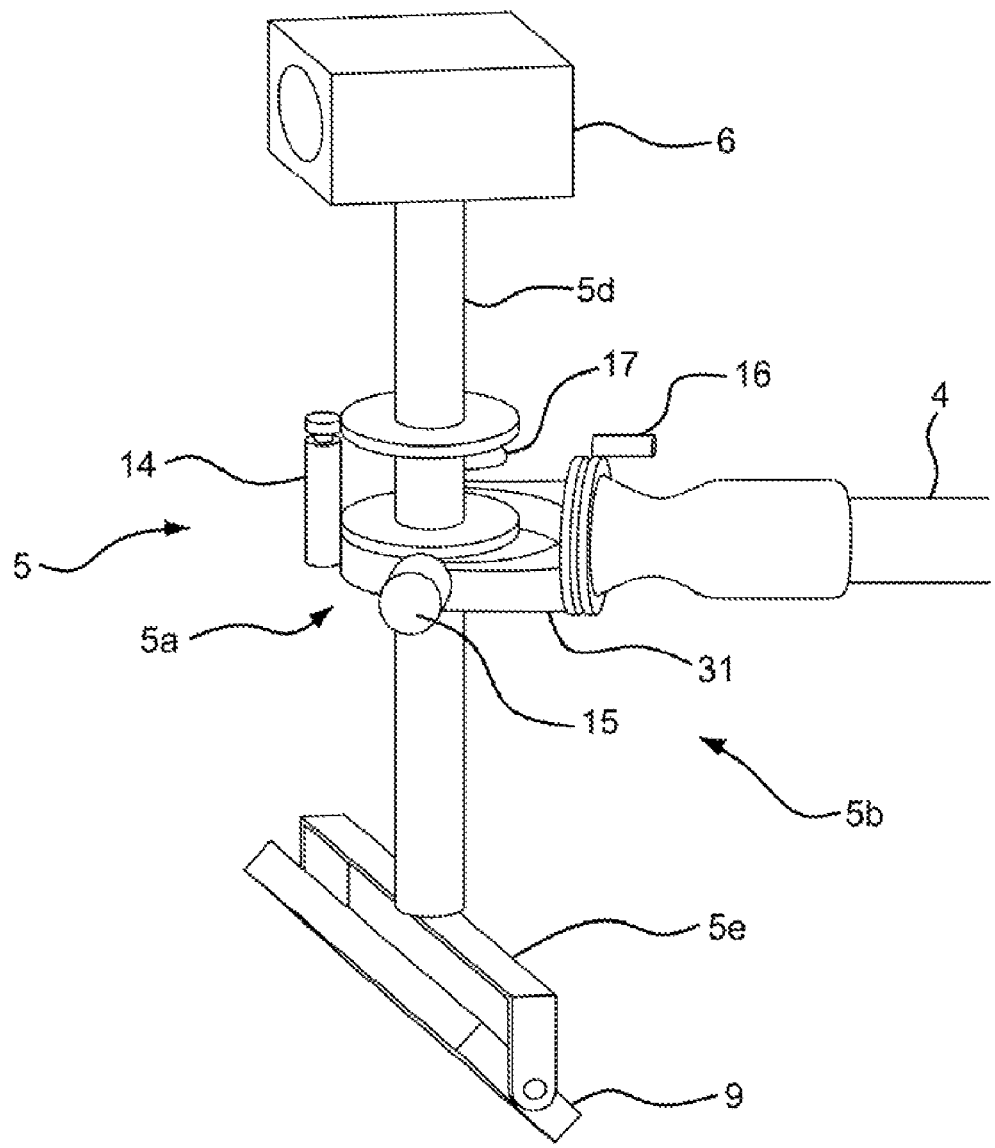
FIG. 7 is shows a slave sled detailing three servo motors, and the camera and miniature auxiliary monitor positions according to an illustrative embodiment of the invention.

FIG. 7 is an enlarged view of slave sled 5 showing the location of three servo motors, 14, 15 and 16, as well as camera 6 and auxiliary monitor 9 according to an illustrative embodiment of the invention. In response to positioning data produced based on motion of the master sled or components thereon, motors 14, 15 and 16 continuously control the angular relationship between slave center post 5d and balance pole 4, to correspond with that of the master sled. The result is that camera 6 is always aimed in the same direction as the master sled, and the operator can intuitively pan, tilt and roll the master sled and observe, by means of either a master monitor or the slave monitor 9, that his intended camera moves are being accomplished. In alternative embodiments of the invention, motion at the slave sled can be amplified, reduced, or have a one-to-one correspondence with motion at the master sled. The relationship between motion at the slave sled and master sled can be proportional, inversely proportional, or have another relationship as dictated by the sensor/motor system configurations and/or the configuration of the support system.

FIG. 7 depicts motor 16, which controls the axial angle between post 4 and the plane of slave gimbal yoke 31. Motor 15 controls the angle between the plane of yoke 31 and a pan bearing race on slave gimbal 5. Motor 14 controls the angle between center post 5d and the aforementioned slave bearing race. In a preferred embodiment, gimbal 5b is positioned at slave sled center-of-balance 5a and locked in place with respect to post 5d by clamp 17 so that the balance of slave sled 5 would be neutral and have no influence on the angle of balance post 4 with respect to post 5d.

Figure 8:
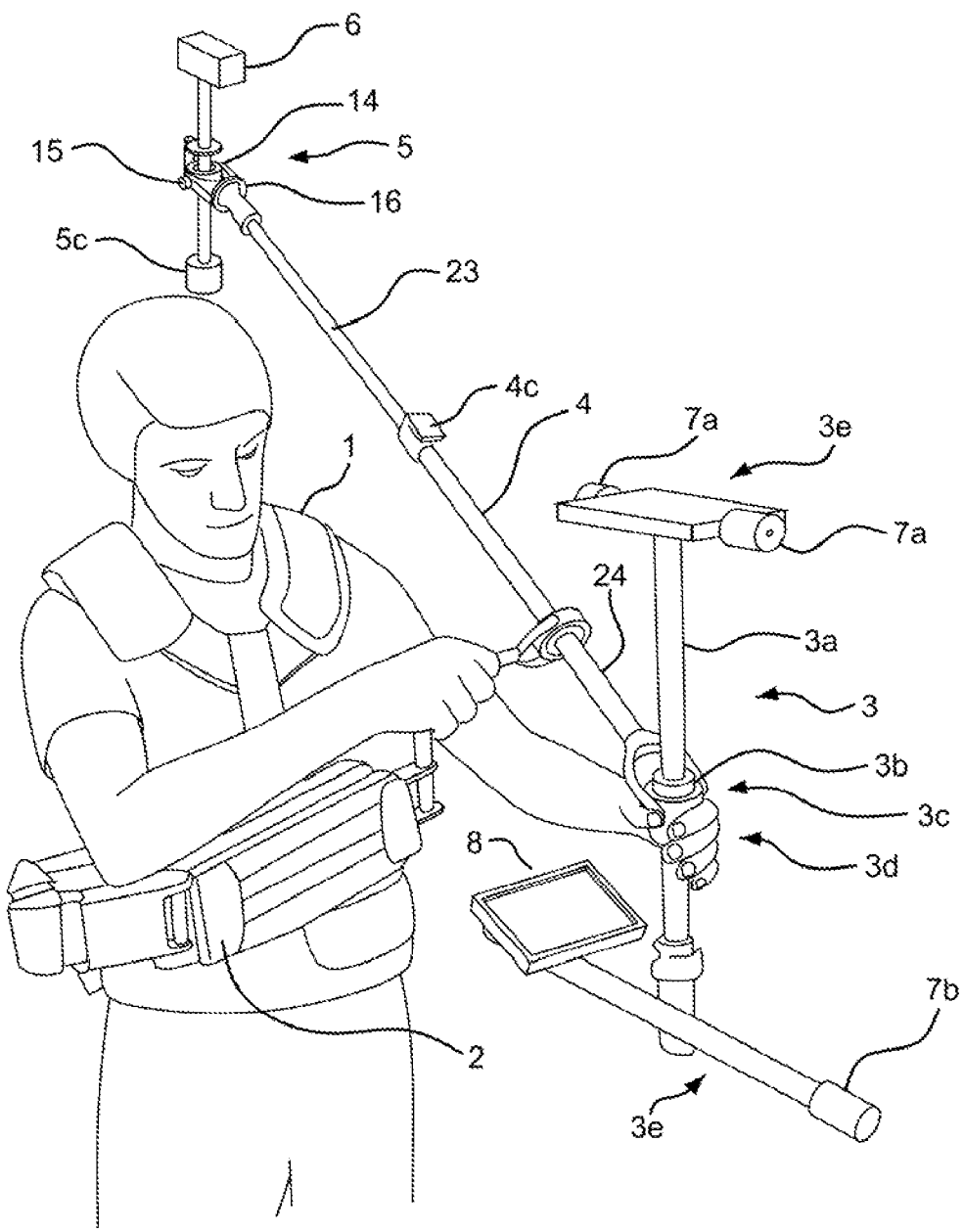
FIG. 8 shows an illustrative embodiment of the invention deployed to shoot above and straight behind the operator.

FIG. 8 shows an illustrative embodiment of the invention deployed in such position and orientation as to shoot above and straight behind the operator. Master sled 3 is aimed to the rear. Balance pole 4 is tilted upward and to the rear. The operator views the correspondingly oriented remote image from camera 6 on master sled monitor 8. Such extreme tilt angles may increase the risk of collisions between some portion of counterweight equipment 3e and pole 4, but these potential interferences are easily avoided by selecting appropriate body positions and post angles for obtaining the desired shot. Since the operator is ambulatory, camera angles that are potentially occluded by some part of the equipment can often be cleared by employing a slightly different body position.

Figure 9:
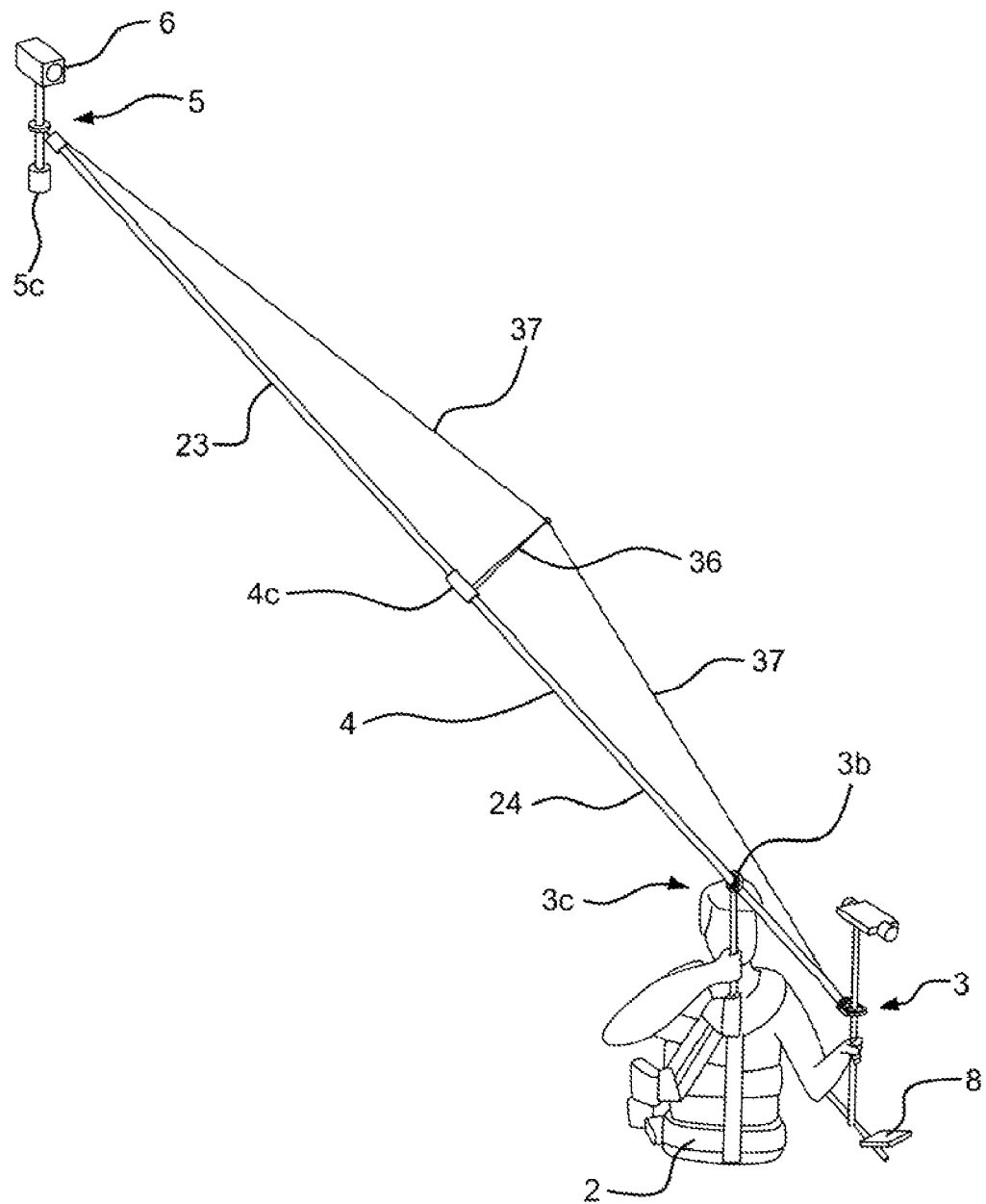
FIG. 9 shows an extended extra-long balance pole deployed between the master and lave sleds according to an illustrative embodiment of the invention.

FIG. 9 shows a super-extended illustrative embodiment of the invention, comprising an extra-long balance pole 4 deployed between master and slave sleds 3 and 5. Extended balance pole 4 includes two segments 23, 24. In this configuration, pole segment 23 extends from gimbal 3b at center of balance 3c to slave sled 5, and is longer than pole segment 24. The shorter pole segment 24 extends from gimbal 3b to master sled 3. The ratio of the distances from gimbal 3b to slave sled 5 and from gimbal 3b to master sled 3 as shown is approximately 6:1. Thus the weight ratio between sleds 3 and 5 (discounting the negligible weight of the balance pole) must be inverse and of the same 6:1 proportion. This may be accomplished by adding or removing counterweights as required above and below the master sled gimbal 3b, and then adjusting the lifting power of arm 2. One or more optional sets of stays 36 and associated shrouds 37 can reduce or eliminate flexing of balance pole 4, thereby substantially maintaining its columnar structure and maintaining its balance about its longitudinal axis, as well as potentially reducing bouncing. Other devices to support or strengthen the balance pole can also be used, either separately or in conjunction with the stays and shrouds. Suitable choice of materials, such as particular composites or alloys, may eliminate or reduce the need for such devices. It is noted, however, that in some embodiments of the invention, the balance pole may not be columnar, but can bow to some extent.

Figure 10:
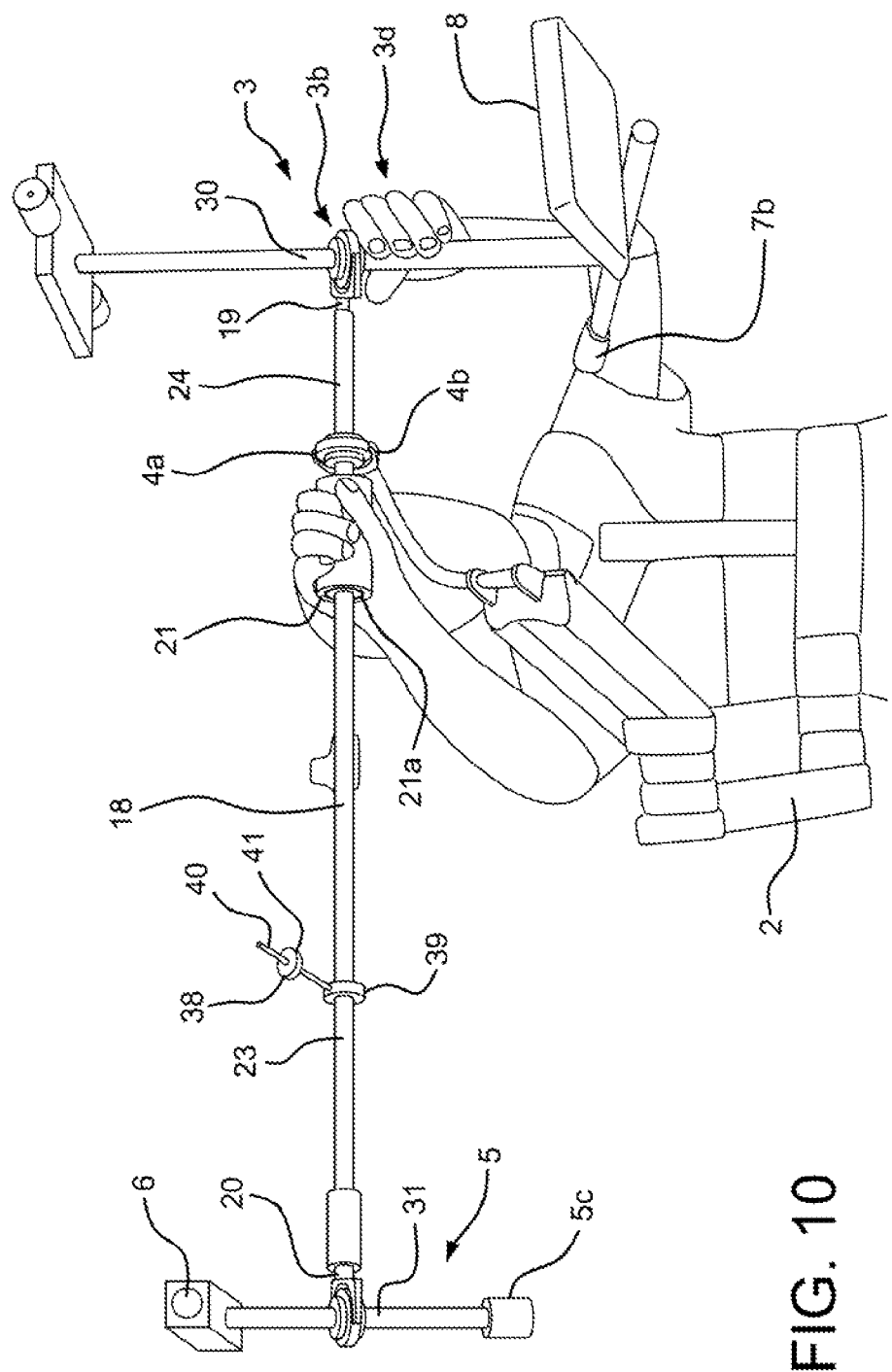
FIG. 10 shows an illustrative embodiment of the invention in which the gimbal yokes of the master and slave sleds are both hard connected to an 'active' balance pole, and thus axially synchronized by mechanical means.

FIG. 10 shows an alternate embodiment of the invention in which the gimbal yokes 30 and 31 of the master and slave sleds both have hard connections 19 and 20 to a rotatable, 'active' balance pole 18, and thus remain axially synchronized by mechanical means. This embodiment has a handgrip 21 having annular bearings 21a or other mechanism to isolate movement of the handgrip and pole 18 from one another. Forces applied by the operator to traverse and/or elevate post 18 are thus not transmitted angularly to post 18 and yokes 30 and 31, and master sled 3 thus remains in substantial angular isolation, excepting only slight axial friction from bearings 21a or other isolating mechanism. This illustrative embodiment of the invention requires only two sensors at the master sled gimbal, and two corresponding motors at the slave gimbal in order to be interconnected in all three axes—one by mechanical means and two by electrical means. Active balance pole 18 may optionally have one or more sets of shrouds and stays as illustrated in FIG. 9. Alternatively, or in addition to the stays and shrouds, a balancing weight clamp 38 can serve to balance balance pole 18 about its longitudinal axis by positioning adjustable weight 41 externally to active balance pole 18. Thus, clamp collar 39, which is connected to balance pole 18, is rotated so that so that threaded rod 40 is pointed in the direction that needs counter-weighting. Clamp collar 39 is then secured to balance pole 18 so it no longer can rotate about it. Adjustable weight 41 is then dialed inward or outward on threaded rod 40 until balance pole 18 is axially balanced. Use of either shrouds-and-stays and/or balancing weight clamp 38 can ensure that the balance of balance pole 18 does not affect the apparent individual balance of either master sled 3 or slave sled 5, about their centers of gravity.

Figure 11:
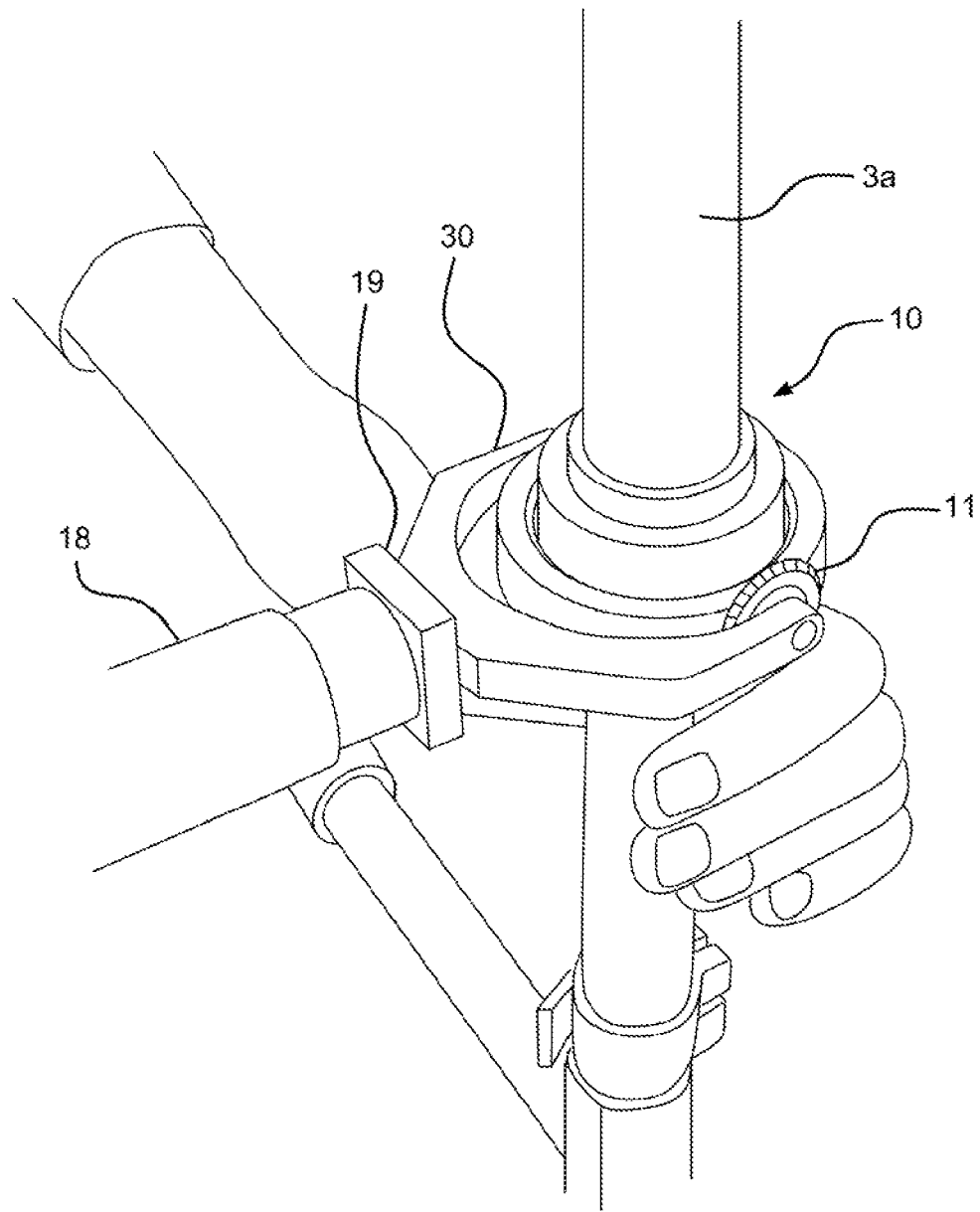
FIG. 11 shows a master sled gimbal yoke mechanically-connected to the active balance post according to an illustrative embodiment of the invention.

FIG. 11 shows an enlarged view of the master sled gimbal 3a showing the mechanical attachment of yoke 30 to active post 18 by means of hard axial connection 19. Two remaining rotation sensors, 10 and 11 implement the servo connection of their respective axes to their counterparts on the slave sled.

Figure 12:
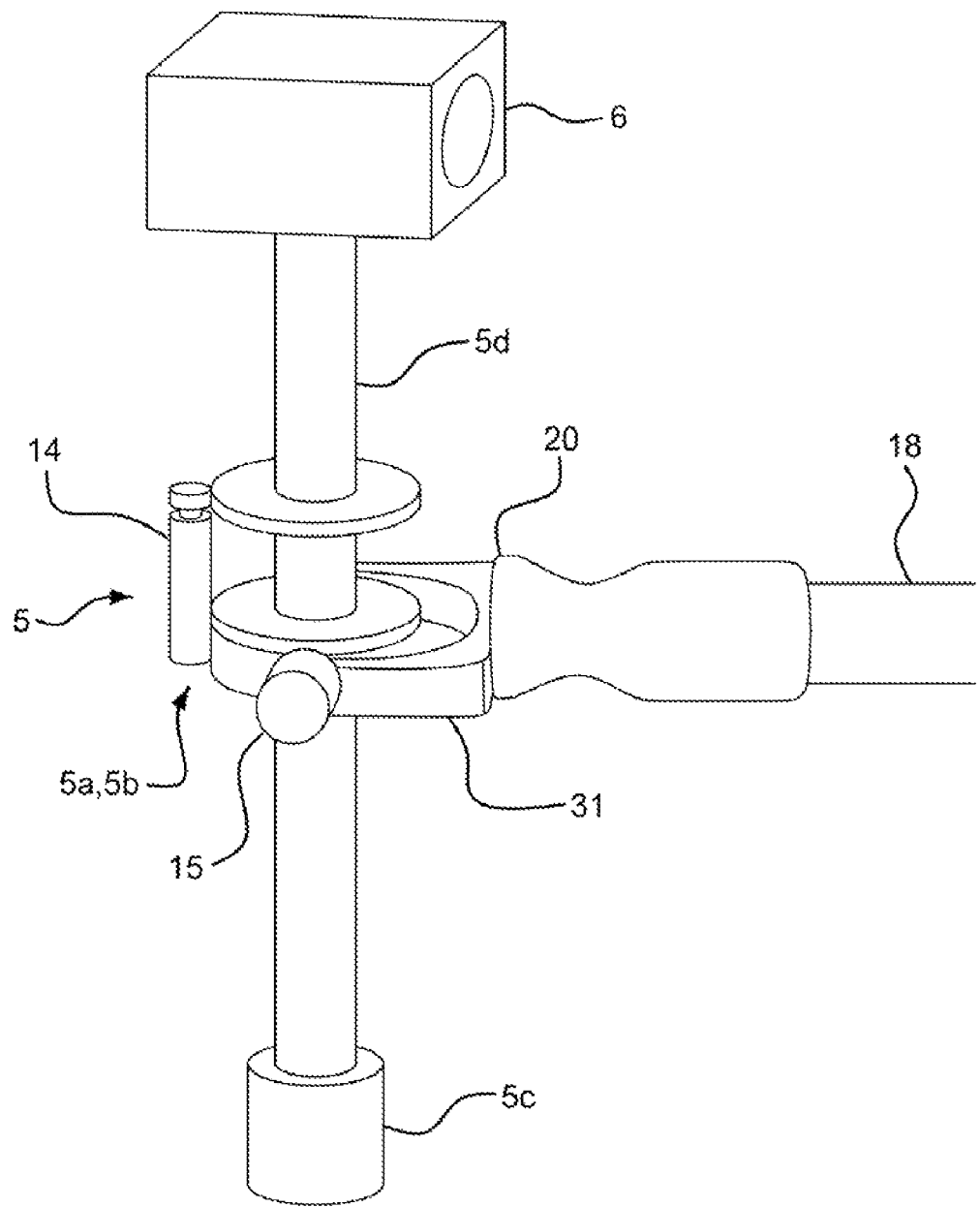
FIG. 12 shows a slave sled yoke mechanically connected to the active balance post according to an illustrative embodiment of the invention.

FIG. 12 shows an enlarged view of the slave sled yoke 31 of FIG. 10, which is attached by means of hard axial connection 20 to active balance post 18. Motors 14 and 15 receive electrical impulses, for example from servo-amplifiers, and synchronize their corresponding axes according to the sensor inputs derived at the master sled so that camera 6 maintains the same angular attitude in all three axes as does the master sled.

Figure 13:
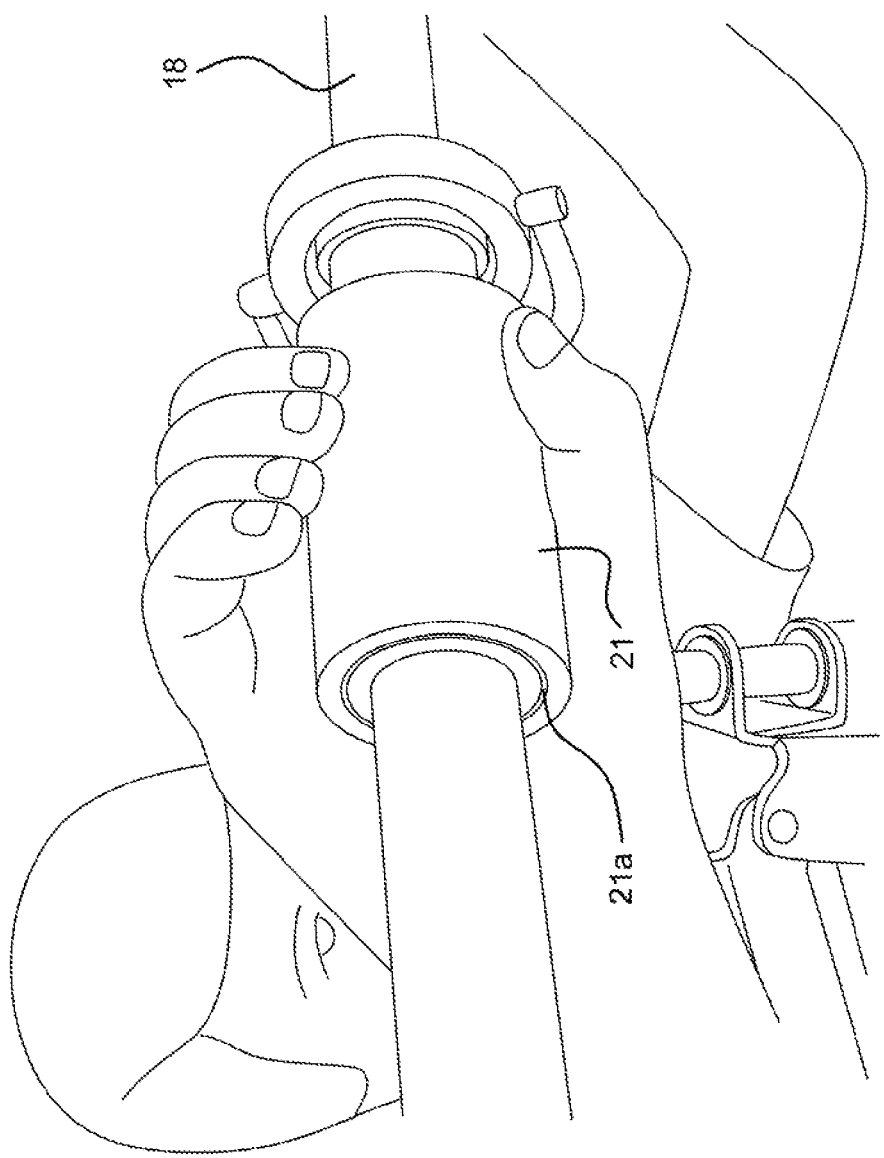
FIG. 13 shows an annular, axially isolated handgrip for elevating and traversing the active balance pole according to an illustrative embodiment of the invention.

FIG. 13 shows an enlarged view of an annular, axially isolated, handgrip 21 for elevating and traversing the active balance pole 18 of the illustrative embodiment of the invention shown in FIG. 10, in which a mechanical connection is substituted for one of the three servo connections. Annular bearings 21a prevent strong traversing and/or elevating motions of the handgrip from having an angular influence on pole 18.

Figure 14:
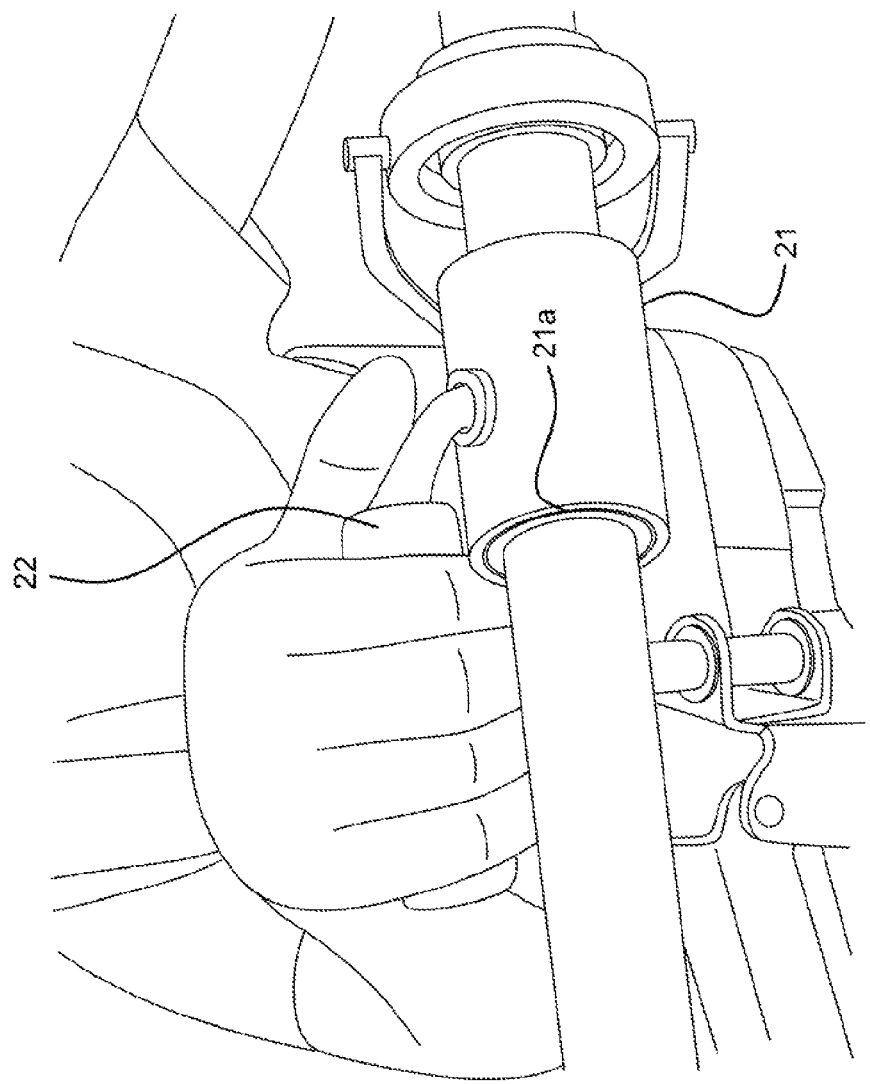
FIG. 14 shows an offset handgrip, hard-connected to an annular, axially isolated handgrip, for elevating and traversing an active balance pole according to an illustrative embodiment of the invention.

FIG. 14 shows another illustrative embodiment of annular, axially isolated handgrip 21, in which a handgrip 22 is offset from, and adjustably hard-connected to, handgrip 21 to enable an operator to more comfortably produce the motions and forces required to elevate and traverse active balance pole 18 without having to distort his handgrip position to accommodate momentary angles of handgrip 21. This embodiment also provides the angular axial isolation of grip 21 from pole 18 by means of annular bearings 21a or other suitable mechanism.

Figure 15:
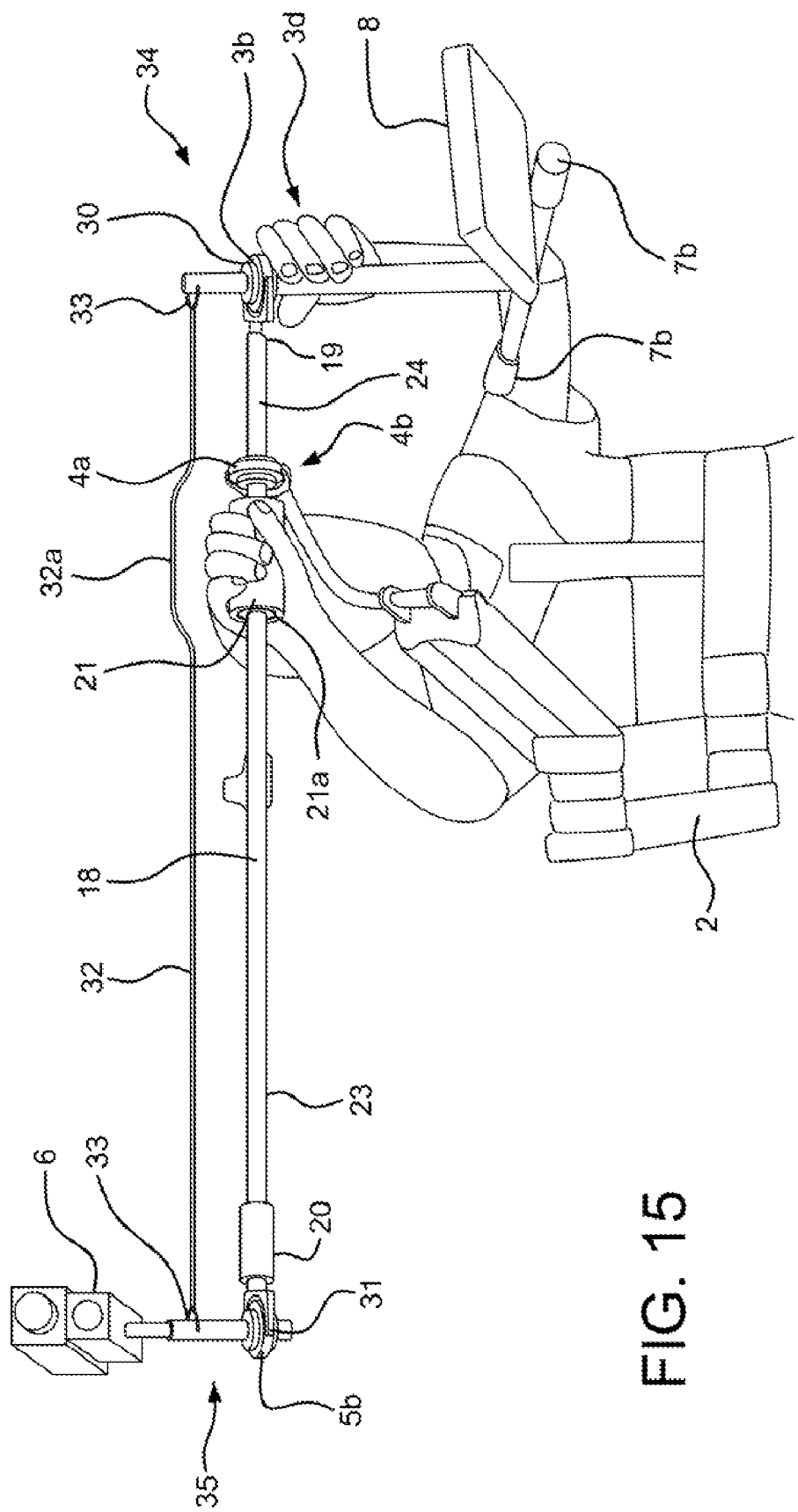
FIG. 15 shows another hard-connected lightweight embodiment with fewer counterweights and with a tie-rod interlocking a second axis of rotation according to an illustrative embodiment of the invention.

FIG. 15 shows another hard-connected lightweight embodiment employing versions of master sled 34 and slave sled 35, neither of which requires counterweights above or below its respective gimbals 3b and 5b because a second axis of rotation is hard-interconnected by means of tie-rod 32. Other connecting devices can also be used, such as pulleys and belts or interconnecting tie wires, for example. Therefore, slave sled 35 carries only camera 6 above gimbal 5b. Master sled 34 has no counterweight above gimbal 3b. As in the embodiment shown in FIG. 12, balance pole 4 and master and slave gimbal yokes 30 and 31 have a hard-interconnect to one axis of rotation of master sled 34 with respect to slave sled 35. Tie rod 32 is attached to pivoting yokes 33a, 33b at the slave and master sled ends of pole 18, respectively. The hard connection between the master sled end and the slave sled end by virtue of tie-rod 32 and yokes 33a, 33b facilitate transmitting the pivot angle of master sled 34 to slave sled 35. Tie rod 32 can optionally comprise tie rod hand relief bend 32a to mitigate interference between tie rod 32 and the operator's hand, such as may occur for example at extreme pitch angles of operation. This also interlocks a second axis of rotation, so that master sled counterweights 7b and 8 can serve to balance camera 6 as if mounted directly above and below each other on a single virtual center post, suspended by a single virtual gimbal. The result is that angular control of master sled 34 by an operator at handgrip position 3d produces substantially identical rotations of camera 6 on slave sled 35. Neither sled 34 nor 35 is independently counterweighted to approximate neutral angular balance, but the interconnected combination of sleds 34, 35, balance pole 4, and pivoting yokes 30, 31 and 33 provide the same feel as if operating a conventional single-sled support device, such as a Steadicam®, yet with the additional freedom to achieve extra-high and extra-low lens heights; and to extend horizontally as shown. Synchronization in the respective pan axes of master and slave sleds 34, 35 can be achieved by either sensor/motor means or by means of paired tie-rods and cranks (see FIG. 16) and/or belts and gears such as sector gears.

Figure 16:
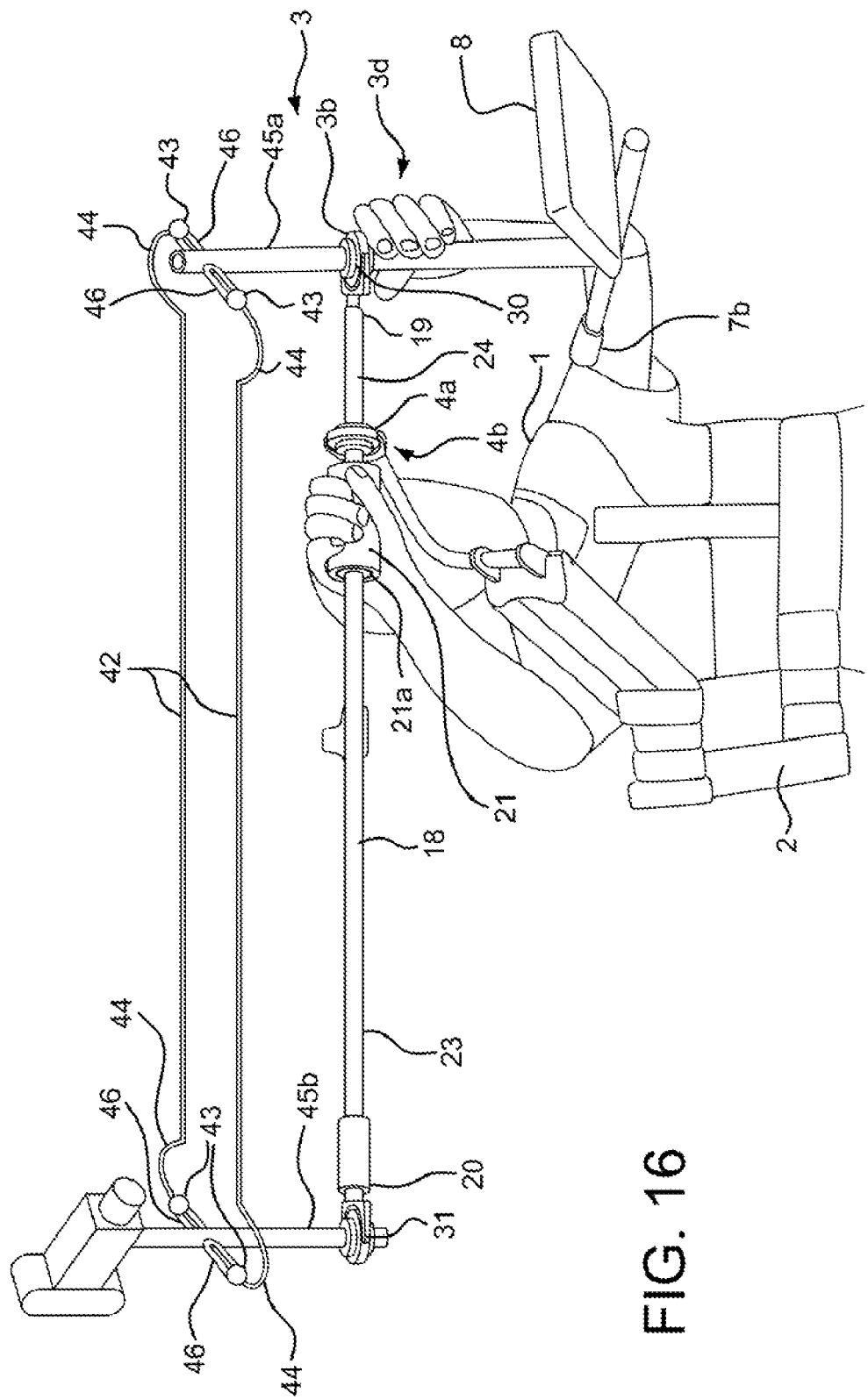
FIG. 16 depicts a support system in which a multi-part tie rod synchronizes both pitch motions and limited panning motions between master and slave sleds according to an illustrative embodiment of the invention.

FIG. 16 shows support system that does not necessarily require electronic servo motor connections in which a multi-part tie rod synchronizes both pitch motions and limited panning motions between master and slave sleds according to an illustrative embodiment of the invention. Tie rods 42 extend between tie rod universal joints 43 and thus, rigidly attach the extremities of tie rod struts 46 but remain angularly disconnected in two axes by means of tie rod universal joints 43. Tie rods 42 are therefore able to synchronize limited panning motions between master and slave sleds. Tie rod relief bends 44 can increase the angular range of panning motions by preventing early interference between tie rods 42 and extended master and slave center posts 45a,b.

Figure 17:
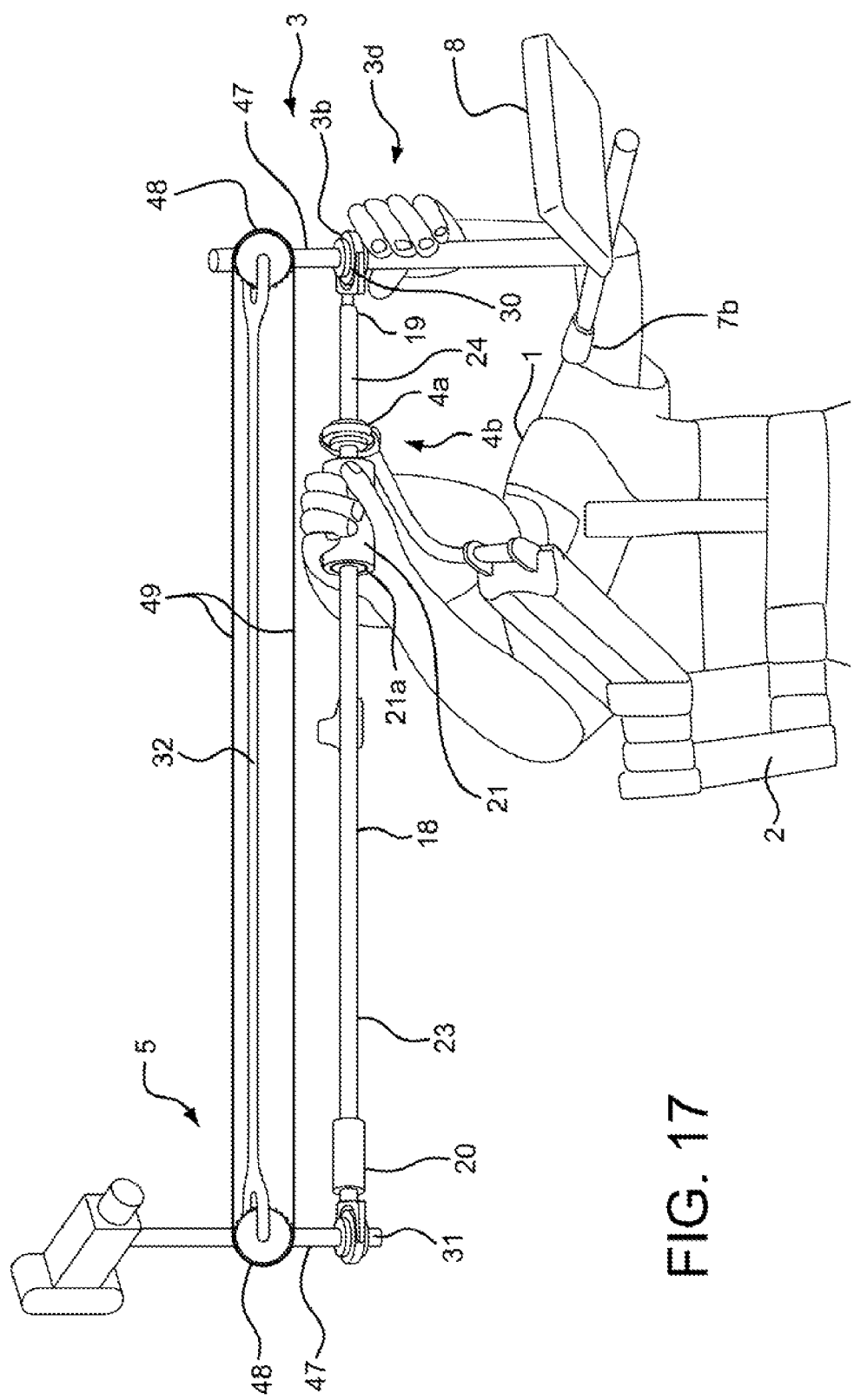
FIG. 17 depicts an illustrative embodiment of the invention which toothed gears and a belt operate in conjunction with a tie rod to synchronize both pitch and panning motions between master and slave sleds.

FIG. 17 illustrates another support structure that does not necessarily require electronic servo motor connections in which toothed gears and a belt operate in conjunction with a tie rod to synchronize both pitch and panning motions between master and slave sleds according to an illustrative embodiment of the invention. Toothed gears 48 and belt 49 operate in conjunction with tie rod 32 to synchronize both pitch and panning motions between master sled 3 and slave sled 5. Bevel-gear sets 50ab (shown in FIG. 18) intersect to transmit the panning motions applied to master sled 3 via belt 49 and gear wheels 48.

Figure 18:
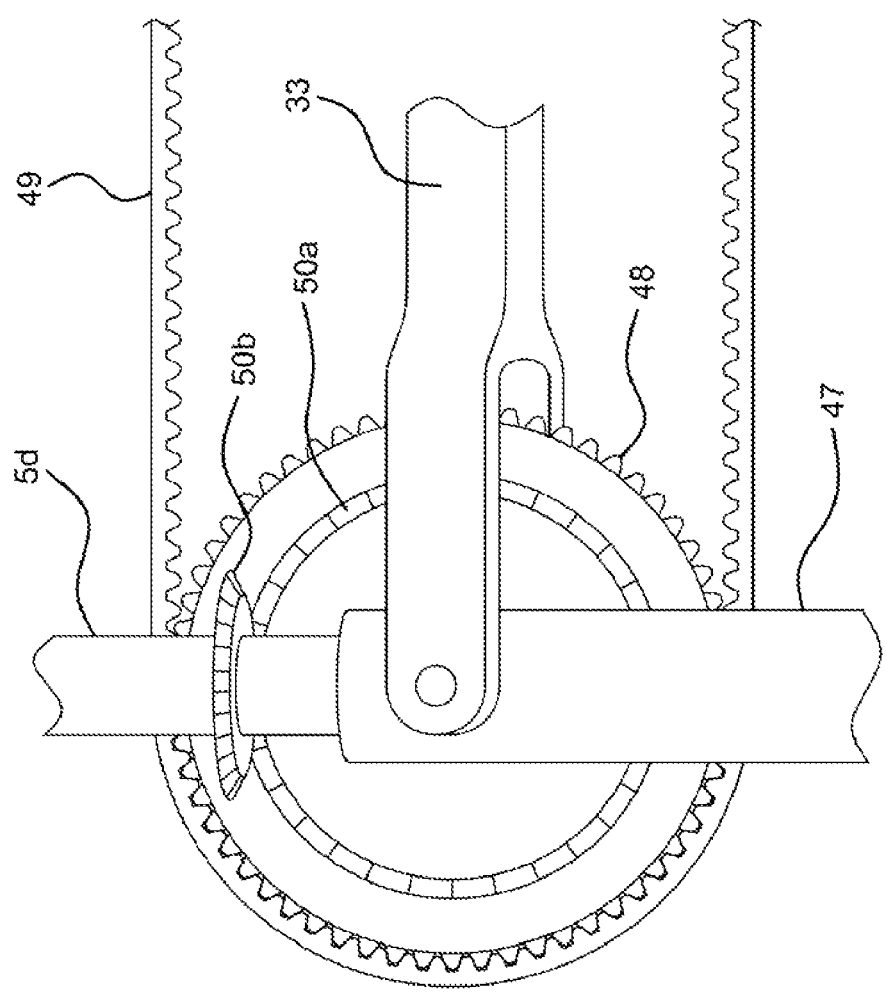
FIG. 18 provides further details of the embodiment depicted in FIG. 17, showing the mechanical interconnection between master and slave sleds by means of a gear belt and bevel-gears to effect the synchronization of panning motions.

FIG. 18 provides further detail of the illustrative embodiment of FIG. 17, showing the mechanical interconnection between master and slave sleds by a gear belt and bevel-gears to effect the synchronization of panning motions according to an illustrative embodiment of the invention. The slave end of the mechanical interconnection between master sled 3 and slave sled 5 includes a pan control gear belt 49 and bevel-gear set 50a and 50b which transmit and synchronize panning motions imparted to master sled 3 to slave sled center post 5d. Slave sled tie rod yoke (which is disposed around an end portion of tie rod 32) is pivotally attached to extended outer race tube 47 (which is disposed around a portion of slave center post 5d) and by means of tie rod 32 also synchronizes the pitch angle between slave sled 3 and master sled 5.

Figure 19:
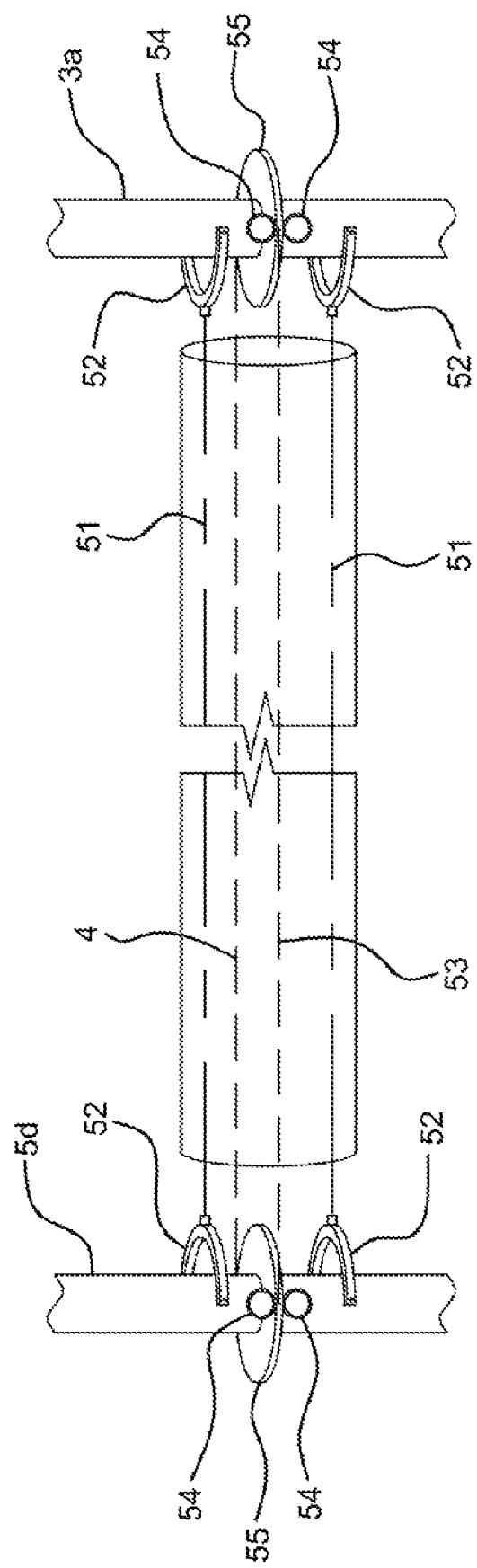
FIG. 19 depicts a support system with synchronizing components disposed within the balance pole according to an illustrative embodiment of the invention.

FIG. 19 diagrammatically depicts a support system with synchronizing components disposed within a balance pole according to an illustrative embodiment of the invention. Parallelogram tension cables 51a, b run substantially parallel to one another and longitudinally through the balance pole. They are pivotally connected by means of yokes 52 to each of the slave and master support sections so that movement of the master center post 3a is replicated at the slave center post 5d. Pan axes endless belt 53 extends between pan axes main drive gears 55 and guided onto gears 55 by means of belt idler gears 54. Belt 53 is preferably a 3-D toothed belt. Tension in wires 51 and belt 53 is to be maintained by the incompressibility of balance pole 4, which is attached by yoke 30 to master gimbal 3b and by yoke 31 to slave gimbal 5b. Note that for diagrammatic clarity, none of these is shown in FIG. 19.

The invention also includes methods of using and making the devices described herein.

Various embodiments of the invention have been described, each having a different combination of elements. The invention is not limited to the specific embodiments disclosed, and may include different combinations of the elements disclosed.

Some or all of the following attributes may be present in embodiments of the invention:

- a simple, inexpensive, compact body- or vehicle-supported mount for lightweight cameras that can be extended at a distance from the operator in any direction and reach lens-heights from 'floor to ceiling', without undue exertion and with intuitive, accurate, local, three-axis angular control over the extended camera;
- extended reach and angular agility so that stabilized shots can be made that preferably include unrestricted and intuitive angular control of the camera, as well as large lateral and vertical displacements from the operator's position;
- continuous vertical range of motion in a body-mounted camera stabilizing devices, with the elimination of low-mode brackets, low-mode conversions;
- a multi-sectional telescoping post, which can be elongated to facilitate high lens-heights and, extra-low lens heights in 'low mode', without the angular inertia in the 'tilt' axis becoming disproportionately large compared with the unchanged angular inertia in the 'pan' axis to provide a less cumbersome device to operate and which remains angularly agile as well as stabilized;
- a structurally simple and electronically uncomplicated improvement in the functionality and angular agility of body-mounted 'roll-cage' camera stabilizing devices, which does not require expensive, level-sensing, gyro- and-pendulum integrating computers to preserve the level attitude of the camera;
- three-axis angular control of a remotely positioned camera head without having to elevate or traverse a long sled center post;
- improved angular agility as compared to conventional pole-mounted camera supports, so that they can be remotely panned and tilted (and rolled) with intuitive precision, rather than controlled by means of awkward and non-intuitive 'joysticks,' which do not inherently 'back-pan';
- improved angular stability as compared to conventional pole-mounted camera supports, so that they can provide level and stable shots even during violent dynamic motion, and still facilitate precision operator control;
- improved angular control as compared to conventional extended pole-mounted camera supports, so that they automatically 'back-pan' (meaning that as the pole traverses horizontally or 'booms' vertically, the camera's angular attitude is not correspondingly altered, and is therefore much easier to consistently and precisely 'aim' at a distant subject;
- a 'pole-mounted' camera that can selectively pan and tilt more than 360° without seeing its own local supporting structures within the shot.
- a support system for extremely light camera chip/lens combinations, such as, for example, those weighing less than one pound, which can still be stabilized by the angular inertia of a larger, heavier structure;
- a camera support and operational system that provides extremely low and high lens positions, but does not require protracted bodily exertions to accomplish these shots;
- a support system having fully-isolated inertial stability, but adapted to servo-control a one-to-one 'master/slave' relationship between the momentary angular attitude of a master sled (optionally without a camera) and that of a miniature slave sled, with attached lightweight camera, mounted, respectively, at the extreme ends of an intervening, extended balance pole;
- remote facilitation of angular and spatial control of lightweight video cameras by means that are stable and repeatable and do not add additional angular inertia at extreme high/low elevations or lateral extensions;
- a continuous 'boom' range (range of dynamic vertical motion) that permits the lens to elevate from 'floor to ceiling' at will, and traverse horizontally without applying any angular disturbance to the master sled;
- the momentary dynamic tri-axial relationship of the master sled center post to the attached balance pole reproduced approximately one-for-one at the other end with respect to the center post of the slave sled and its associated camera, so that its angular relationship to the longer lightweight end of the balance pole continuously mimics that of the master sled to the shorter, heavy end of the pole;
- primary view finding of the image generated by the camera on the slave sled, via a conventionally positioned monitor on the master sled;
- secondary view finding by means of an additional monitor, which acts as counterweight for the slave sled and a way to view the image when the operator's attention must be concentrated on the proximity of the slave sled to any obstacles;
- a small, compact camera head that can penetrate small openings, yet preserve locally independent pan/tilt/roll capabilities; and that can even be moved from inside a moving vehicle out into the slipstream without transmitting any wind buffeting to the stabilizing mass of the master sled sequestered inside the vehicle;
- control of two cameras simultaneously: one on the master sled and an optionally smaller one on the slave sled at the far end of the extended balance pole, such that angular direction of the latter is "slaved" to that of the former and the operator can supply, for example, simultaneous wide and close-up shots of a scene;
- modular configuration for addition of lightweight pole segments, or 'super-post' telescoping segments, or dynamically extending and retracting segments such that the camera can be hyper-extended as much as 20 or more feet from the ambulatory operator, yet remain stable, intuitively controlled and automatically 'back-panned' and 'back-tilted' for consistent aiming, as the extra-long balance pole is elevated and traversed; and
- remote control of a slave camera extended on a balance pole without the necessity of locally counterweighing the mass of the camera at the slave end, thus facilitating the use of heavier cameras.

While this invention has been described with respect to the preferred and simplified embodiments above, it is to be understood that various alterations and modifications can be made to components of the stable, extendable, angularly agile camera support within the scope of this invention. For example, although the invention is particularly applicable to use with cameras, the invention can be used to support, aim, position and/or stabilize other types of equipment or tools.

The invention claimed is:

1. A support system comprising:
   a balance pole with a primary end and a secondary end;
   one or more primary component masses connected to and balanced around the balance pole primary end with a primary gimbal having more than one degree of freedom;
   one or more secondary component masses connected to and balanced around the balance pole secondary end with a secondary gimbal having more than one degree of freedom;
   a three-axis tertiary gimbal attached to the balance pole at its center of balance; and
   a mechanism to replicate the motion of the primary gimbal at the secondary gimbal.

2. The support system of claim 1 wherein the motion replicating mechanism comprises:
   sensors that detect the rotational motion about each of the axes of rotation of the primary gimbal; and
   motors functionally connected to the secondary gimbal to impart rotational motion about each of the axes of rotation of the secondary gimbal;
   wherein the motors impart the rotational motion based upon signals received from the sensors, thereby replicating the motion about the axes of rotation of the primary gimbal about the axes of rotation of the secondary gimbal.

3. The support system of claim 2 wherein at least one of the sensors and at least one of the motors form a closed loop.

4. The support system of claim 3 wherein at least one of the motors is a servo motor.

5. The support system of claim 1 wherein the motion replicating mechanism comprises one or more rigid connections causing the primary component masses to be fixed with respect to the secondary component masses with respect to rotation about one or more axes of rotation.

6. The support system of claim 5 wherein the primary component masses are fixed with respect to the secondary component masses with respect to rotation about the pitch axis.

7. The support system of claim 5 wherein the primary component masses are fixed with respect to the secondary component masses with respect to rotation about the longitudinal axis of the balance pole.

8. The support system of claim 5 wherein the primary component masses are fixed with respect to the secondary component masses via one or more tie-rods.

9. The support system of claim 1 wherein the primary component masses include a monitor.

10. The support system of claim 1 wherein the primary component masses include an equipment component and one or more weights to counterbalance the equipment.

11. The support system of claim 1 wherein the secondary component masses include an equipment component and one or more weights to counterbalance the equipment.

12. The support system of claim 1 wherein:
    the primary component masses include an equipment component and one or more weights to counterbalance the equipment; and
    the secondary component masses include an equipment component and one or more weights to counterbalance the equipment.

13. The support system of claim 1 wherein:
    the primary component masses include a primary equipment component and one or more weights to counterbalance the primary equipment component;
    the secondary component masses include a secondary equipment component and no counterbalancing weights.

14. The support system of claim 1 wherein the secondary component masses include a camera.

15. The support system of claim 1 wherein the primary component masses include a monitor and the secondary component masses include a camera.

16. The support system of claim 1 wherein the balance pole is telescopic.

17. The support system of claim 1 further comprising:
    one or more shrouds and one or more stays to reduce bowing of the balance pole.

18. The support system of claim 1 wherein the mechanism to replicate the motion of the primary gimbal at the secondary gimbal comprises:
    cables disposed within the balance pole.

19. A support system comprising:
    an articulated arm attached to a support system as in claim 1.

20. A method of balancing and utilizing equipment comprising:
    providing a support system as in claim 1;
    balancing the primary component masses with respect to one another at the primary end;
    balancing the secondary component masses with respect to one another at the secondary end;
    balancing the balance pole about its longitudinal axis;
    balancing the primary masses with respect to the secondary masses about the balance pole;
    moving the primary gimbal apparatus and thereby replicating the movement in the secondary gimbal apparatus while maintaining the approximate balance of the component masses.

21. A support system comprising:
    a balance pole with a primary end and a secondary end;
    one or more primary component masses connected to and balanced around the balance pole primary end with a primary gimbal apparatus;
    one or more secondary component masses connected to and balanced around the balance pole secondary end with a secondary gimbal apparatus;
    a tertiary gimbal attached to the balance pole at its center of balance;
    a mechanism to replicate the motion of the primary gimbal at the secondary gimbal;
    the motion replicating mechanism comprising one or more rigid connections causing the primary component masses to be fixed with respect to the secondary component masses with respect to rotation about one or more axes of rotation; and
    wherein the primary component masses are angularly synchronized with respect to the secondary component masses via one or more pulleys and belts.

22. The support system of claim 21 comprising at least one annular bearing positioned to allow the handgrip to be freely rotatable about the balance pole.

23. The support system of claim 21 further comprising an offset handgrip component adjustably connected to the handgrip.

24. A support system comprising:
    a balance pole with a primary end and a secondary end;
    one or more primary component masses connected to and balanced around the balance pole primary end with a primary gimbal apparatus;

one or more secondary component masses connected to and balanced around the balance pole secondary end with a secondary gimbal apparatus;

a tertiary gimbal attached to the balance pole at its center of balance;

a mechanism to replicate the motion of the primary gimbal at the secondary gimbal;

the motion replicating mechanism comprising one or more rigid connections causing the primary component masses to be fixed with respect to the secondary component masses with respect to rotation about one or more axes of rotation;

wherein the primary and secondary gimbals provide only two degrees of angular freedom each, the degrees of angular freedom being the same degrees of angular freedom for each gimbal, and wherein the support system further comprises a handgrip connected to, but freely rotatable about, the balance pole.

25. A support system comprising:

a balance pole with a primary end and a secondary end;

one or more primary component masses connected to and balanced around the balance pole primary end with a primary gimbal apparatus;

one or more secondary component masses connected to and balanced around the balance pole secondary end with a secondary gimbal apparatus;

a tertiary gimbal attached to the balance pole at its center of balance;

a mechanism to replicate the motion of the primary gimbal at the secondary gimbal; and wherein the primary component masses and the secondary component masses each include a camera.

26. A support system comprising:

a balance pole with a primary end and a secondary end;

one or more primary component masses connected to and balanced around the balance pole primary end with a primary gimbal apparatus;

one or more secondary component masses connected to and balanced around the balance pole secondary end with a secondary gimbal apparatus;

a tertiary gimbal attached to the balance pole at its center of balance;

a mechanism to replicate the motion of the primary gimbal at the secondary gimbal; and a balance clamp disposed around the balance pole and having a weight with an adjustable location on the clamp to balance the balance pole about its longitudinal axis.

27. The support system of claim 26 wherein the balance clamp comprises:

a weight threadedly attached to a rod, the rod positioned so the weight can be dialed inward or outward on threaded rod until the balance pole is balanced about its longitudinal axis.

28. A support system comprising:

a balance pole with a primary end and a secondary end;

one or more primary component masses connected to and balanced around the balance pole primary end via a primary center post with a primary gimbal apparatus;

one or more secondary component masses connected to and balanced around the balance pole secondary end via a secondary center post with a secondary gimbal apparatus;

a tertiary gimbal attached to the balance pole at its center of balance;

a mechanism to replicate the motion of the primary gimbal at the secondary gimbal;

wherein the mechanism to replicate the motion of the primary gimbal at the secondary gimbal comprises:

a primary tie strut pivotally attached to the primary center post and having a first universal joint at a first end and a second universal joint at a second end;

a secondary tie strut pivotally attached to the secondary center post and having a first universal joint at a first end and a second universal joint at a second end;

a first tie rod longitudinally disposed between the primary strut first universal joint and the secondary strut first universal joint; and a second tie rod substantially parallel to the first tie rod and longitudinally disposed between the primary strut second universal joint and the secondary strut second universal joint.

29. A support system comprising:

a balance pole with a primary end and a secondary end;

one or more primary component masses connected to and balanced around the balance pole primary end via a primary center post with a primary gimbal apparatus;

one or more secondary component masses connected to and balanced around the balance pole secondary end via a primary center post with a secondary gimbal apparatus;

a tertiary gimbal attached to the balance pole at its center of balance;

a mechanism to replicate the motion of the primary gimbal at the secondary gimbal;

wherein the mechanism to replicate the motion of the primary gimbal at the secondary gimbal comprises:

a tie rod extending from a primary race tube to a secondary race tube;

the primary race tube disposed about a primary center post;

the primary center post disposed through the primary gimbal;

the secondary race tube disposed about a secondary center post;

the secondary center post disposed through the secondary gimbal, the tie rod having a primary end and a secondary end with a gimbal at each end;

the primary race tube having a primary toothed gear attached thereto and the secondary race tube have a secondary toothed gear attached thereto; and a belt functionally compatible with and connected to the toothed gears.

30. A support system comprising:

a balance pole with a primary end and a secondary end;

one or more primary component masses connected to and balanced around the balance pole primary end with a primary gimbal apparatus;

one or more secondary component masses connected to and balanced around the balance pole secondary end with a secondary gimbal apparatus;

a tertiary gimbal attached to the balance pole at its center of balance;

a mechanism to replicate the motion of the primary gimbal at the secondary gimbal; and wherein the mechanism to replicate the motion of the primary gimbal at the secondary gimbal comprises:

cables disposed within the balance pole; and a belt and gear system in functional relationship to the cables.

* * * * *